United States Patent
Saito

(10) Patent No.: US 8,934,801 B2
(45) Date of Patent: Jan. 13, 2015

(54) IMAGE FORMING APPARATUS AND METHOD OF FIXER TEMPERATURE CONTROL IN A POWER-SAVING MODE

(75) Inventor: Yasushi Saito, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 878 days.

(21) Appl. No.: 13/079,887

(22) Filed: Apr. 5, 2011

(65) Prior Publication Data

US 2011/0243594 A1    Oct. 6, 2011

(30) Foreign Application Priority Data

Apr. 6, 2010 (JP) .................................. 2010-087981

(51) Int. Cl.
G03G 15/20 (2006.01)
H04N 1/00 (2006.01)
G03G 15/00 (2006.01)

(52) U.S. Cl.
CPC ....... H04N 1/00413 (2013.01); G03G 15/2078 (2013.01); G03G 15/5004 (2013.01); H04N 1/00 (2013.01); H04N 1/00435 (2013.01); H04N 1/00482 (2013.01); H04N 1/00896 (2013.01); H04N 1/00931 (2013.01); G03G 15/502 (2013.01); H04N 2201/0094 (2013.01); G03G 2215/00109 (2013.01)
USPC .................. 399/70; 399/81; 399/77; 713/323

(58) Field of Classification Search
USPC ..................... 399/70, 76–77, 80, 81; 713/323
See application file for complete search history.

(56) References Cited

U.S. PATENT DOCUMENTS

| | | | | |
|---|---|---|---|---|
| 5,642,185 | A * | 6/1997 | Altrieth et al. | 399/81 |
| 6,166,355 | A * | 12/2000 | Watanabe et al. | 219/497 |
| 6,335,797 | B1 * | 1/2002 | Hirosawa | 358/1.15 |
| 6,697,580 | B2 * | 2/2004 | Nakayama | 399/33 |
| 7,154,518 | B2 * | 12/2006 | Kim | 347/185 |
| 2009/0281992 | A1 * | 11/2009 | Bestgen et al. | 707/3 |

FOREIGN PATENT DOCUMENTS

JP    03075759 A  *  3/1991
JP    9-30079        2/1997

OTHER PUBLICATIONS

English Translation of reference Sakai (JP 03-075759 A). Publication date Mar. 29, 1991.*

* cited by examiner

*Primary Examiner* — Clayton E Laballe
*Assistant Examiner* — Trevor J Bervik
(74) *Attorney, Agent, or Firm* — Smith, Gambrell & Russell, LLP

(57) ABSTRACT

Upon recovery from a power-saving mode to a normal mode and then restart of fixing temperature control from a state in which the fixing temperature control is stopped, a control part (display control part 10 obtains a current temperature of a fixing part based on output of a temperature detector and required stabilization time T1 based on required stabilization time data, and based on necessary time data A and the number of remaining setting screens on which settings need to be made in a wizard format, issues a restart signal RS for restarting the fixing temperature control between a first time point TP1 reached by tracing back by the required stabilization time T1 from a predicted time point at which making the settings is predicted to complete and a second time point TP2 as a time point the necessary time before the first time point.

20 Claims, 16 Drawing Sheets

Fig.10A

| Temperature (°C) | Required stabilization time (seconds) |
|---|---|
| 0 | t1 |
| 5 | t2 |
| 10 | t3 |
| 15 | t4 |
| 20 | t5 |
| 25 | t6 |
| ... | ... |
| 170 | tx |

Fig.10B

| Necessary time | A seconds |
|---|---|

| Temperature(°C) | Required stabilization time (seconds) |
|---|---|
| 0 | t1 |
| 5 | t2 |
| 10 | t3 |
| 15 | t4 |
| 20 | t5 |
| 25 | t6 |
| ⋮ | ⋮ |
| 170 | tx |

Before update

| Temperature(°C) | Required stabilization time (seconds) |
|---|---|
| 0 | t1±d |
| 5 | t2±d |
| 10 | t3±d |
| 15 | t4±d |
| 20 | t5±d |
| 25 | t6±d |
| ⋮ | ⋮ |
| 170 | tx±d |

After update

User registration and change

| · User name abcdef K13 [Change] | · User(KANA) K17 [Change] |
| · Login user name abcdefgh K14 [Change] | · Login password ******** K18 [Change] |
| · Access level User K15 [Change] | · Department you belong K19 [Change] |
| · Mail address abc@def.com [Change] K16 | · Network address K20 [Change] |

[New] K12  [Cancel]  [Register] K21

| user1 | A1 |
|-------|-----|
| user2 | A2 |
| user3 | A3 |
| user4 | A4 |
| user5 | A5 |
| user6 | A6 |
| ⋮ | ⋮ |
| userN | AN |

IMAGE FORMING APPARATUS AND METHOD OF FIXER TEMPERATURE CONTROL IN A POWER-SAVING MODE

This application is based on Japanese Patent Application No. 2010-087981 filed on Apr. 6, 2010, the contents of which are hereby incorporated by reference.

BACKGROUND OF THE INVENTION

1. Field of the Invention

The present invention relates to an image forming apparatus such as a copier, a multi-function printer (MFP), a printer, or a FAX machine.

2. Description of Related Art

In recent years, due to, for example, an increase in environmental problem consciousness, measures for reducing power consumption have been taken even for an image forming apparatus. For example, in an image forming apparatus forming a toner image, a fixing part including a heater is provided to heat and fix the toner image. Typically, power consumption in the heater accounts for a large portion of power consumed in the image forming apparatus. Thus, an image forming apparatus has been suggested which attempts to provide great power saving effect through power supply control at the fixing part.

Specifically, there is an image forming apparatus including: a data converting section converting document data into bit map data and outputting it; an image forming section forming an image through a xerographic method based on the bit map data; a standby state setting section setting the image forming state at a standby state and releasing the standby state in accordance with release instructions; a predicting section predicting time for the conversion by the data converting section in response to print start instructions; and a warm-up start instructing section, based on a difference between the conversion time predicted by the predicting section and time required for the image forming section to shift to a print-ready state since the release of the standby state, determining timing of releasing the standby state and providing the release instructions to the standby state setting section. The image forming apparatus starts the warm-up at appropriate timing with, for example, a printer with long warm-up time. With this configuration, efforts are made to shorten waiting time until start of printing while reducing power consumption.

Typically, in an image forming apparatus such as a copier or the like, under a given condition (for example, an unused state continues for a while), power supply to part of the configuration is stopped to reduce the power consumption in some cases (shift from a normal mode to a power-saving mode). For example, in the power-saving mode, the power supply to the fixing part including the heater, etc. is stopped.

In the state in which the power consumption has been reduced, at least part of functions in the image forming apparatus is in an unusable state. For example, when the power supply to the fixing part is stopped, a temperature of the fixing part cannot be maintained at a printable temperature. Thus, for example, with user's inputting (for example, operation of a key or a touch panel provided in the MFP) as a trigger, the power supply to a portion where the power supply has been stopped restarts (recovery from the power-saving mode to the normal mode). For example, for the fixing part, the power supply is restarted, and the fixing part is warmed up to the printable temperature through power distribution to the heater.

On the other hand, in the MFP, for a predefined function, a setting screen may be displayed in a wizard format (in an interactive manner). In a case of this wizard format, the user performs inputting on setting screens sequentially displayed. Consequently, omission of a setting can be reduced even if the user is still unfamiliar with the settings and operation.

In making settings in the wizard format, the inputting is performed on the sequentially displayed screens, and thus some time is required for completion of making the settings. Thus, even when warm-up has been started as a result of the recovery from the power-saving mode to the normal mode and then the fixing part has been warmed up to the printable temperature, making the settings in the wizard format have not yet been completed in some cases. Therefore, there arises a problem of waste of power consumed at the fixing part from when the fixing part has been warmed up to the printable temperature to when a job starts in accordance with the settings made in the wizard format after the completion of making the settings.

Attempts made especially in recent image forming apparatuses are shortening time required for warming up the fixing part through, for example, heater power enrichment, temperature increase streamlining, or use of a material with small specific heat. Thus, the time required for the user to perform inputting in the wizard format may become longer.

The image forming apparatus described above does not accept the settings made in the wizard format. Moreover, the image forming apparatus described above starts warming up before data supply to thereby avoid a delay in printing start as a result of not ending the warming up even after completion of data preparation. Therefore, this image forming apparatus cannot cope with a problem of waste of power generated when the settings have been made in the wizard format, that is, the problem of the waste of the power consumed at the fixing part from when the fixing part is warmed up to the printable temperature to when a job starts following the completion of making the settings in the wizard format.

SUMMARY OF THE INVENTION

Thus, it is an object of the present invention to bring a time point at which making a setting in a wizard mode is completed closer to a time point at which warming up of a fixing part is completed to thereby eliminate waste of power at the fixing part and achieve power saving.

To achieve the object of the invention, an image forming apparatus of the invention includes: an operation part including an input part for inputting settings related to the image forming apparatus and a display performing display in a wizard format in which setting screens for a plurality of predefined functions are sequentially displayed in an interactive manner; a fixing part which has therein a heater for fixing a toner onto paper, which performs fixing temperature control for maintaining a temperature at a printable temperature as a temperature required for fixing a toner image, which shift from a normal mode to a power-saving mode under a condition that a predefined time has passed while no inputting has been made on the input part, a condition that instructions for shift to the power-saving mode has been provided to the input part, or both conditions, and which stops the fixing temperature control; a temperature detector for detecting a temperature of the fixing part; and a storage part storing at least: required stabilization time data for defining a required stabilization time as time required for reaching the printable temperature when the fixing temperature control has been performed starting with a current temperature of the fixing part; and necessary time data for defining a necessary time required for making a setting for one of the setting screens in the wizard format; and a control part which recognizes inputting of settings to the input part, which, upon recovery from the power-saving mode to the normal mode since inputting to the input part has been performed and/or an operation detection part has detected that the operation on the image forming apparatus has been performed and then restart of the fixing temperature control from a state in which the fixing temperature control is stopped, obtains a current temperature of the fixing part based on output of the temperature detector and the required stabilization time based on the required stabilization time data, which, based on the necessary time data and a number of remaining setting screens on which settings need to be performed in the wizard format, issues the restart signal between a first time point as a time point reached by tracing back by the required stabilization time from a predicted time point at which making the settings are predicted to complete and a second time point as a time point traced back by the necessary time from the first time point.

With this configuration, upon the recovery to the normal mode, a time point at which a job is started as a result of completion of making the settings in the wizard format can be brought closer to a time point at which the fixing part reaches the printable temperature. Therefore, waste of power consumed from when the fixing part is warmed up to the printable temperature to when the job is started following the completion of making the settings in the wizard format can be reduced.

Further features and advantages of the invention will be more clarified by embodiments described below.

BRIEF DESCRIPTION OF THE DRAWINGS

FIG. 10A is a diagram showing one example of required stabilization time data for defining a time point at which the fixing temperature control starts according to the first embodiment;

FIG. 10B is a diagram showing one example of necessary time data for the same;

FIG. 14 is an explanatory diagram showing one example of a user registration change screen of the MFP according to the third embodiment; and FIG. 15 is a diagram showing one example of necessary time data according to the third embodiment.

DETAILED DESCRIPTION OF PREFERRED EMBODIMENTS

Hereinafter, a first embodiment of the present invention will be described with reference to FIGS. 1 to 10. This embodiment will be described, referring to an MFP 100 (corresponding to an image forming apparatus) as an example. Note that elements including configuration, arrangement, etc. described in this embodiment do not limit the scope the invention and thus just serve as illustrative examples.

(Outline of Image Forming Apparatus)

Figure 1:
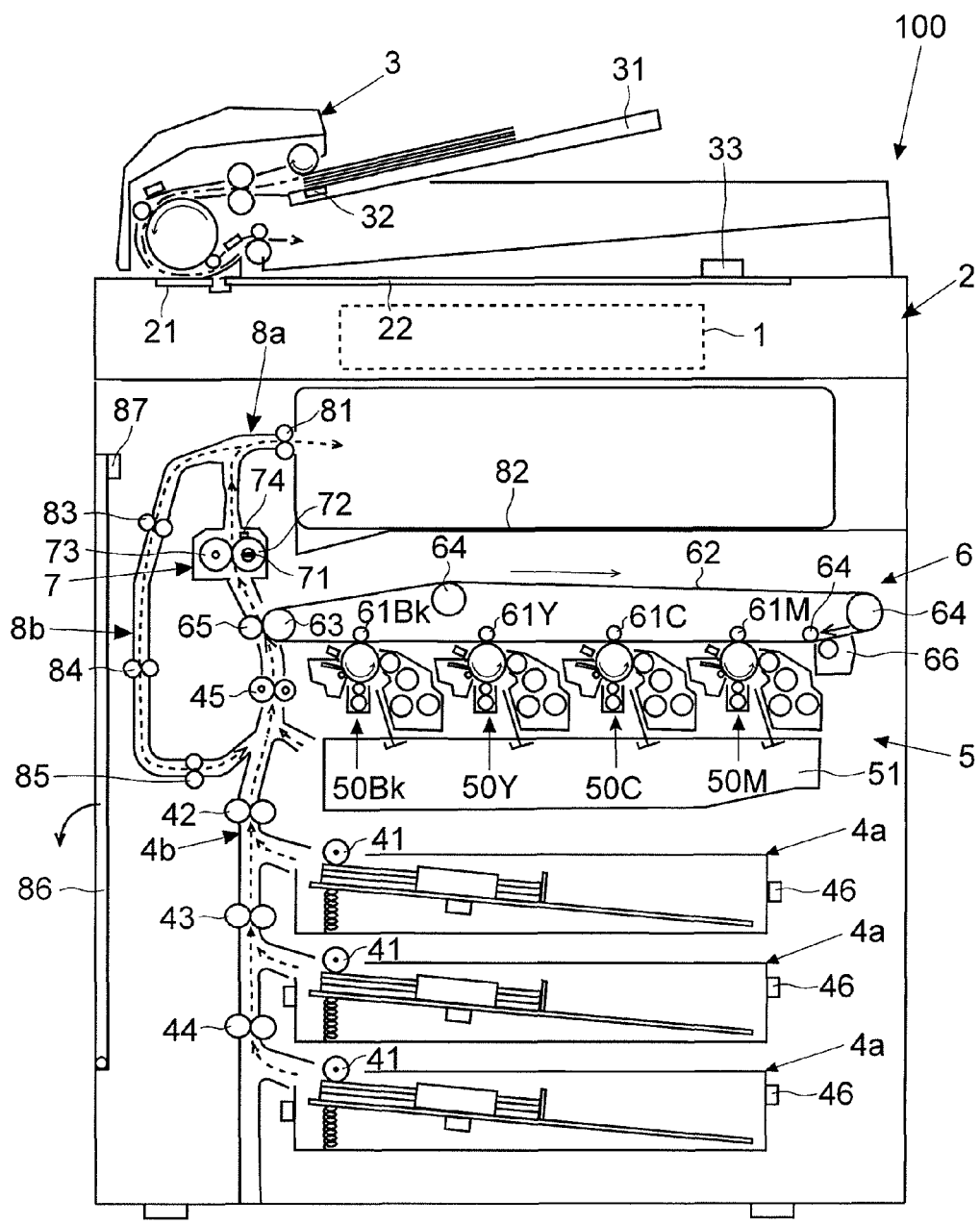
FIG. 1 is an elevation pattern cross section showing one example of an MFP according to a first embodiment of the present invention.

First, an outline of the MFP 100 according to the first embodiment of the invention will be described with reference to FIG. 1. FIG. 1 is an elevation pattern cross section showing one example of the MFP 100 of the first embodiment of the invention.

As shown in FIG. 1, provided at the front in elevation view of the MFP 100 is an operation panel 1 (corresponding to an operation part). The MFP 100 of this embodiment has an image reading part 2 and a document conveying device 3 provided at the top of the MFP 100. The MFP 100 includes inside a main body thereof: paper feed parts 4a; a conveying path 4b; an image forming part 5; an intermediate transfer part 6; a fixing part 7; a discharge and conveying part 8a; a double-sided conveying path 8b; etc.

The document conveying device 3 has a document tray 31 where documents to be read are loaded. The document conveying device 3 automatically and consecutively conveys the documents one by one from the document tray 31 to a reading position (fed-document reading contact glass 21). The document conveying device 3 is fitted to the image reading part 2 in such a manner as to be openable and closable vertically with a far side of a paper surface of FIG. 1 as a support point, and functions as a cover that presses contact glasses (the fed-document reading contact glass 21 and a loaded-document reading contact glass 22) of the image reading part 2 from above.

The document conveying device 3 is provided with: a document loading sensor 32 (for example, an optical sensor, corresponding to an operation detection part) for detecting that the documents have been loaded; a document opening and closing sensor 33 (for example, an optical sensor, and it may be provided on an image reading part 2 side and correspond to an operation detection part) for detecting that the document conveying device 3 is in a open state.

Next, arranged at the top of the image reading part 2 are: as shown in FIG. 1, the fed-document reading contact glass 21; and the loaded-document reading contact glass 22 where documents such as a book are loaded to be read one by one. Arranged inside of the image reading part 2 are: a lamp, a mirror, a lens, an image sensor, etc. (not shown). The image sensor, based on light reflected on a document passing through the fed-document reading contact glass 21 or a document loaded on the loaded-document reading contact glass 22, reads the document. Then the image sensor converts the reflected light into an analog electrical signal in accordance with image density and then performs quantization, thereby obtaining image data of the document. Note that the image reading part 2 of this embodiment can read both a color image and a black-and-white image.

The plurality of paper feed parts 4a in the main body of the MFP 100 can be inserted and detached, and respectively store a plurality of pieces of various kinds of paper (for example, copy paper, recycled paper, a cardboard, an OHP sheet, etc.) of different sizes (for example, A-type paper and B-type paper such as A4, B4, etc.). Each of the paper feed parts 4a includes a paper feed roller 41 driven into rotation and delivers the paper one by one to the conveying path 4b upon printing.

For the purpose of detecting the insertion and the detachment, each of the paper feed parts 4a is provided with an insertion and detachment detection sensor 46 (corresponding to an operation detection part). For example, the insertion and detachment detection sensor 46, by making contact with a side surface of the paper feed part 4a, can use an interlock switch with which ON/OFF of the output is switched, and it is only required to be capable of detecting the insertion and the detachment of the paper feed part 4a.

The conveying path 4b is a path for conveying the paper from the paper feed parts 4a to the image forming part 5 in the apparatus. Provided at the conveying path 4b are: a guide plate for paper guidance; conveying roller pairs 42, 43, and 44 driven into rotation upon the paper conveyance; a registration roller pair 45 that puts the paper to be conveyed on standby before the image forming part 5 and then delivers the paper in synchronization with transfer of a formed toner image; etc.

The image forming part 5 includes: a plurality of image forming units 50 (50Bk for black, 50Y for yellow, 50C for cyan, and 50M for magenta) and an exposure device 51. The exposure device 51, based on, for example, the image data read at the image reading part 2 and image data stored in a storage device 92 to be described below, outputs laser light while turning it on and off to thereby subject each of photoconductive drums to scanning exposure. Each image forming unit 50 is provided with: the photoconductive drum supported in such a manner as to be capable of being driven into rotation; and a charging device, a developing device; a cleaning device, etc. which are disposed around the photoconductive drum. By each image forming unit 50 and the exposure device 51, a toner image is formed onto a circumferential surface of the corresponding photoconductive drum.

The intermediate transfer part 6, in response to primary transfer of the toner image from each image forming unit 50, performs secondary transfer on a sheet. The intermediate transfer part 6 is composed of: primary transfer rollers 61Bk to 61M; an intermediate transfer belt 62; a driving roller 63; a plurality of driven rollers 64; a secondary transfer roller 65; a belt cleaning device 66; etc. Each of the primary transfer rollers 61Bk to 61M sandwich the endless intermediate transfer belt 62 with the corresponding photoconductive drum. To each of the primary transfer rollers 61Bk to 61M, a transfer voltage is applied, whereby the toner images are transferred onto the intermediate transfer belt 62.

The intermediate transfer belt 62 is stretched over the driving roller 63, etc., and rounds by rotational driving of the driving roller 63 connected to a driving mechanism such as a motor (not shown). The driving roller 63 sandwiches the intermediate transfer belt 62 with the secondary transfer roller 65. The toner images (of the different colors including black, yellow, cyan, and magenta) respectively formed at the image forming units 50 are primarily transferred onto the intermediate transfer belt 62 in sequence while superposed on one another without any displacement and then transferred onto the sheet by the secondary transfer roller 65 to which a predetermined voltage has been applied.

The fixing part 7 fixes the toner images transferred onto the paper. The fixing part 7 is mainly composed of: a heating roller 72 that has a built-in heater 71 heated through power distribution; and a pressure roller 73 making pressure-contact therewith. For the heater 71, the one which is heated through power distribution (for example, a halogen heater, a planar heater including a resistor, or the like) is used. Upon passage of the paper through a nip between the heating roller 72 and the pressure roller 73, a toner melts and is heated, whereby the toner images are fixed onto the paper. The paper discharged from the fixing part 7 is delivered towards a discharge tray 82.

Provided at the fixing part 7 is a temperature sensor 74 (corresponding to a temperature detector) for recognizing a temperature inside the fixing part 7. For the temperature sensor 74, a thermistor can be used, although not limited thereto as long as it can detect the temperature. Using this temperature sensor 74, control of the power distribution to the heater 71 is performed, and upon printing or in a standby state before entry to a power-saving mode, the heating roller 72 and the pressure roller 73 are maintained at a printable temperature (for example, approximately 170 to 200 degrees Celsius) required for melting the toner.

The discharge and conveying path 8a has: a discharge roller pair 81 that is driven into rotation to deliver the paper towards the discharge tray 82 or that inversely rotates and switches back for double-sided printing. The double-sided conveying path 8b links a downstream side of the fixing part 7 and an upstream side of the registration roller pair 45. The double-sided conveying path 8b is provided with, for the purpose of double-sided printing, a plurality of double-sided conveying roller pairs 83, 84, and 85 which are driven into rotation to convey the paper already subjected to one-sided printing.

For the purpose of processing of removing paper upon occurrence of paper jam at the conveying path 4b or the double-sided conveying path 8b or for various kinds of maintenance, an openable and closeable side surface cover 86 is provided at a left side surface of the MFP 100. For detecting opening of the side surface cover 86 (operation performed on the MFP 100), an opening/closing detection sensor 87 (corresponding to an operation detection part) is provided. For example, the opening/closing detection sensor 87, through making contact with an upper end of the side surface cover 86, can use an interlock switch that switches output between ON/OFF, but it is only required to detect the opening/closing.

(Operation Panel 1)

Figure 2:
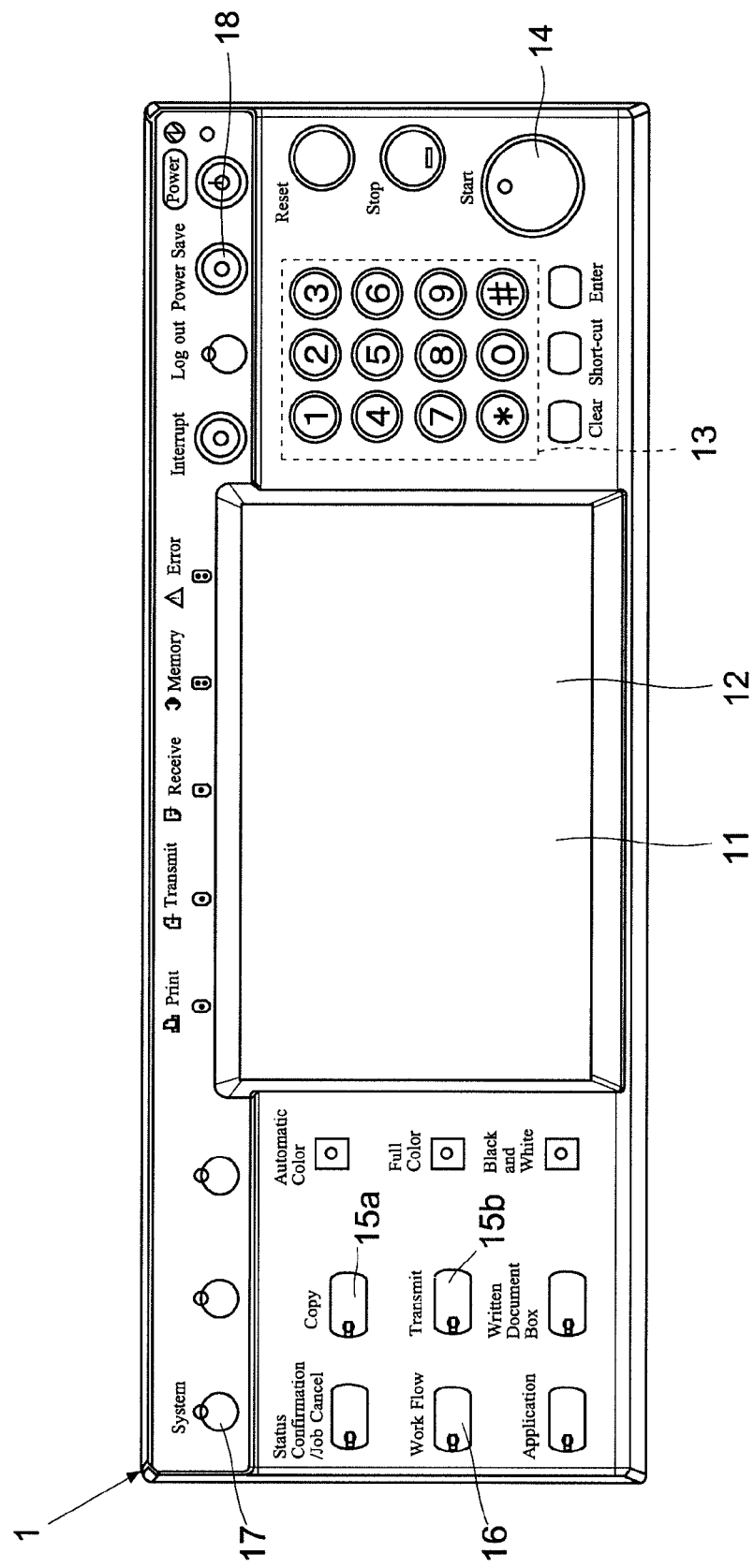
FIG. 2 is a plan view showing one example of an operation panel according to the first embodiment.

Next, referring to FIG. 2, one example of the operation panel 1 according to the first embodiment of the invention will be described. FIG. 2 is a plan view showing one example of the operation panel 1 according to the first embodiment of the invention.

The operation panel 1, as shown in FIGS. 1 and 2, is provided at the top of the MFP 100 in elevation view. The operation panel 1 has: a liquid crystal display part 11 (corresponding to a display part) that displays various kinds of images and screens such as: a menu and keys (see FIG. 6, etc.) for making settings and giving operation instructions for the MFP 100 and the post-processing device (not shown); and a status message of, for example, the MFP 100. The user can press the keys displayed at the liquid crystal display part 11 to make the various settings and giving the operation instructions in copying by the MFP 100.

Provided on a top surface of the liquid crystal display part 11 is a touch panel part 12 (corresponding to an input part), which is provided for the user to detect a position and coordinates of the pressed portion at the liquid crystal display part 11. Through comparison between the coordinates detected with this touch panel part 12 and positions and coordinates of the various keys shown at the liquid crystal display part 11, the key pressed by the user for selection is identified. As the touch panel part 12, no limitation is provided and thus any type such as a resistive film type, a surface acoustic wave type, an infrared type, or an electrostatic capacitance type can be adopted.

Moreover, the operation panel 1 is provided with keys (buttons) as hard keys, as described below. For example, the operation panel 1 is provided with: a ten key part 13 (corresponding to an input part) for numerical input; and a start key 14 (corresponding to an input part) for instructions for starting processing such as copying after various settings are made. Also provided are: a copy key 15a (corresponding to an input part) pressed upon using a copy function; a transmit key 15b (corresponding to an input part) pressed upon using a scanner function or a Fax function; etc. Further provided is a work flow key 16 (corresponding to an input part) pressed upon work flow creation, registration, or work flow calling.

Moreover, provided on the upper left of the operation panel 1 is a system key 17 (corresponding to an input part) pressed upon registration and management of the user and a department. Also provided is a power-saving key 18 (corresponding to an input part) pressed upon shifting the MFP 100 to a power-saving mode or upon its recovery from the power-saving mode to a normal mode. As described above, the touch panel part 12 and the various hard keys provided at the operation panel 1 function as the input parts that for making various kinds of settings and mode selection, etc. for the various functions of the MFP 100.

(Hardware Configuration of the MFP 100, etc.)

Figure 3:
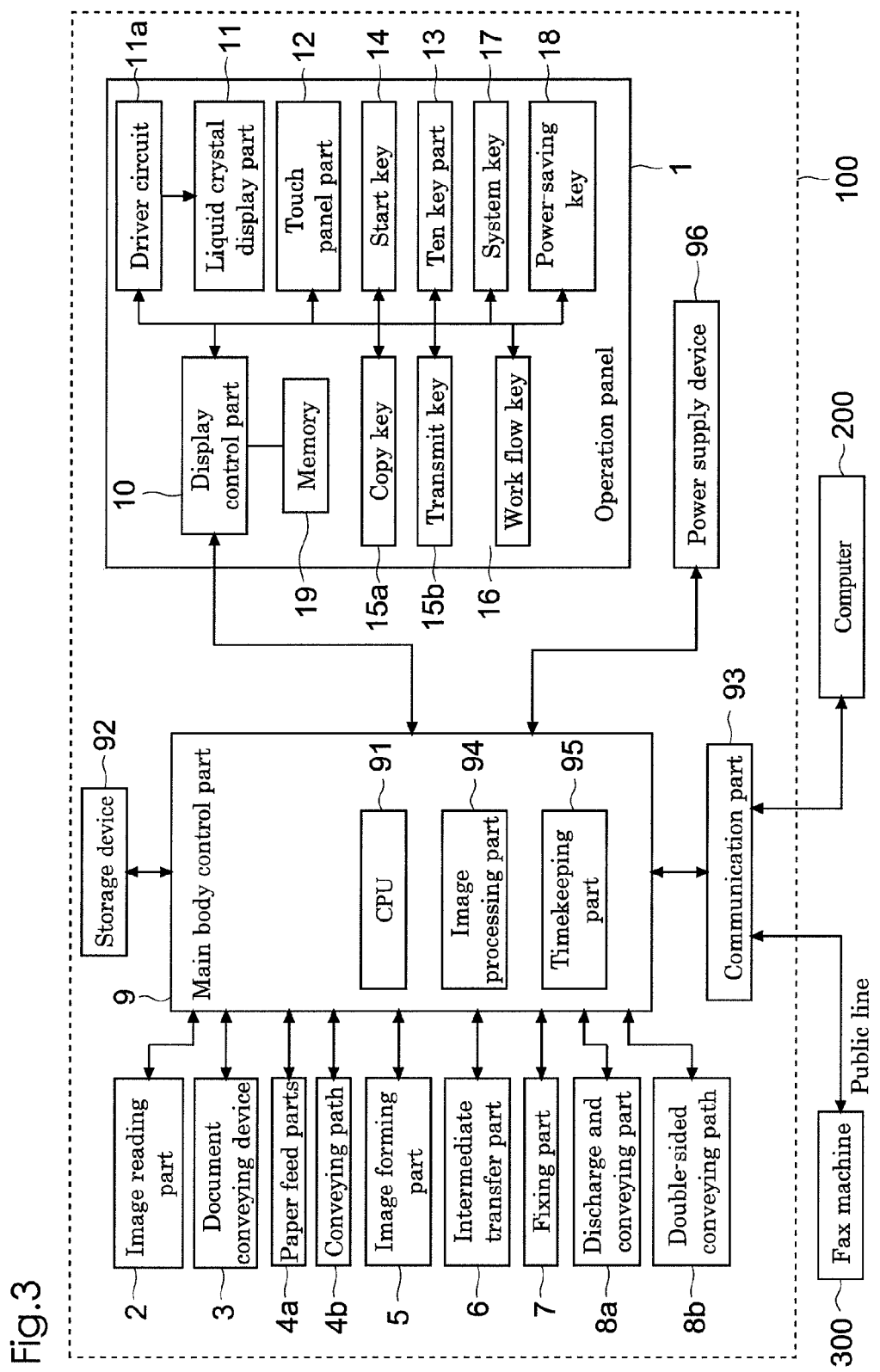
FIG. 3 is a block diagram showing one example of hardware configuration of the MFP according to the first embodiment.

Next, referring to FIG. 3, one example of the hardware configuration of the MFP 100 according to the first embodiment of the invention will be described. FIG. 3 is a block diagram showing one example of the hardware configuration of the MFP 100 according to the first embodiment of the invention.

First, in the main body of the MFP 100, a main body control part 9 is provided. The main body control part 9 is connected to, for example, the operation panel 1, the document conveying device 3, the image reading part 2, the paper feed parts 4a, the conveying path 4b, the image forming part 5, the fixing part 7, the discharge and conveying path 8a, etc., and performs control of these parts.

The main body control part 9 includes elements such as a CPU 91. The CPU 91 performs, for example, computing based on a control program stored in the storage device 92 (corresponding to a storage part) and loaded to control the various parts of the MFP 100. The main body control part 9 may be provided in a plurality of kinds classified on an individual function basis, including, for example, a main control part that performs overall control and image processing and an engine control part that performs, for example, image formation and turning On/Off of a motor rotating different rotors to thereby control printing. In this description, the main body control part 9 will be shown in a collective mode.

The storage device 92 is connected to the main body control part 9. The storage device 92 is composed of a combination of non volatile storage devices such as a ROM, an HDD, etc. and volatile storage devices such as a RAM. The storage device 92 can store various kinds of data such as a control program, control data, setting data, and image data. Moreover, for example, the storage device 92 can store a created work flow. The work flow is a combination of setting items preselected from among a plurality of setting items and registered, and is called to thereby display at the display part a screen for making settings for the preselected and preregistered setting items.

The main body control part 9 is connected to a communication part 93 as interface provided with various connectors, a socket, a telecom chip, a Fax modem, etc. The communication part 93 is connected to a plurality of external computers 200 (for example, personal computers) and opposite-side Fax machines 300 (only one each is shown in FIG. 3 for convenience) via a network, a public line, or the like. For example, the communication part 93 can store the image data obtained at the image reading part 2 into the storage device 92 and transmits it to the external computers 200 and the opposite-side Fax machines 300 (has a scanner function and a Fax function). The communication part 93 can also, based on image data transmitted from the computers 200 or the opposite-side Fax machines 300 and inputted to the MFP 100, perform printing, Fax transmission, etc. (has a printer function and a Fax function).

The main body control part 9 recognizes inputting performed on the operation panel 1, and controls the MFP 100 in a manner such that, for example, copying is performed in accordance with settings made by the user. For example, when a setting for transmitting image data has been made on the operation panel 1, the main body control part 9 controls the communication part 93 to transmit the image data to a set destination.

Moreover, for example, the main body control part 9 is provided with an image processing part 94 that performs image processing on the image data obtained by reading the document at the image reading part 2 and the image data inputted to the MFP 100 through the communication part 93. The image data processed by the image processing part 94 is transmitted to, for example, the exposure device 51 to be used for the scanning and exposure of the photoconductive drums.

The operation panel 1 of this embodiment has: a display control part 10 (corresponding to a control part), a memory 19 (corresponding to a storage part), a driver circuit 11a, the liquid crystal display part 11, the touch panel part 12, etc. The display control part 10 is composed of a CPU, an IC, etc., and controls display of the liquid crystal display part 11 and in response to outputting of the touch panel part 12, identifies the coordinates pressed at the liquid crystal display part 11. Data such as a table showing correspondence between the output of the touch panel part 12 and the coordinates is stored into the memory 19. The display control part 10, for example, through comparison between the coordinates of the pressed position and image data of each setting screen S, identifies and recognizes the key selected (pressed) on the setting screen S.

For example, to select the setting item for each function of the MFP 100 and set a setting value, selection of the key displayed at the liquid crystal display part 11 from a display provided at an uppermost layer in the liquid crystal display part 11 is repeated. Then for each key selection, the display control part 10 switches the display of the liquid crystal display part 11, and the setting value for the function to be selected and set is finally set. The display control part 10 recognizes that the selection and setting of this function has been made, and transmits their details to the main body control part 9 in the main body. Consequently, the main body control part 9 causes the various parts such as the image forming part 5 to perform operation on which the function selected and set on the operation panel 1 is reflected, whereby the user's intention is reflected in printing, etc. (for example, density setting, zooming out/in, etc.).

Then the image data of the screen and the image displayed by the liquid crystal display part 11 are stored into, for example, the memory 19 in the operation panel 1. Therefore, every time the key on a selection screen for selecting a setting item or each setting screen S has been pressed, the display control part 10 reads from the memory 19 the image data of the screen to be displayed next.

The image data of the screen and the image displayed by the liquid crystal display part 11 may be stored into the storage device 92 on the main body side. In this case, the operation panel 1 receives, from the storage device 92 via the main body control part 9, the image data for providing a display at the liquid crystal display part 11. Upon the reception of this image data, the display control part 10 gives instructions to the driver circuit 11a that actually controls the display of the liquid crystal screen. Note that without providing the operation panel 1 with the display control part 10 and the memory 19, configuration of the main body control part 9 (the CPU 91 and the storage device 92) may perform functions of the display control part 10 and the memory 19.

Moreover, the main body control part 9 is connected to a power supply device 96. The power supply device 96 is connected to, for example, a commercial power source, is provided with a rectifier circuit, a step-up/down circuit, etc., and generates a plurality of kinds of voltages required in the MFP 100. For example, the power supply device 96 generates the voltages (for example, DC 24V) for driving various motors in the MFP 100 and the voltages for driving elements in each main body control part 9 (for example, DC5V, 3.3V, 1.8V, etc.), and supplies them to each the main body control part 9, etc. The power supply device 96 also provides to, for example, the heater 71 of the fixing part 7 an AC voltage supplied from the commercial power source.

(Normal Mode and Power-Saving Mode)

Figure 4:
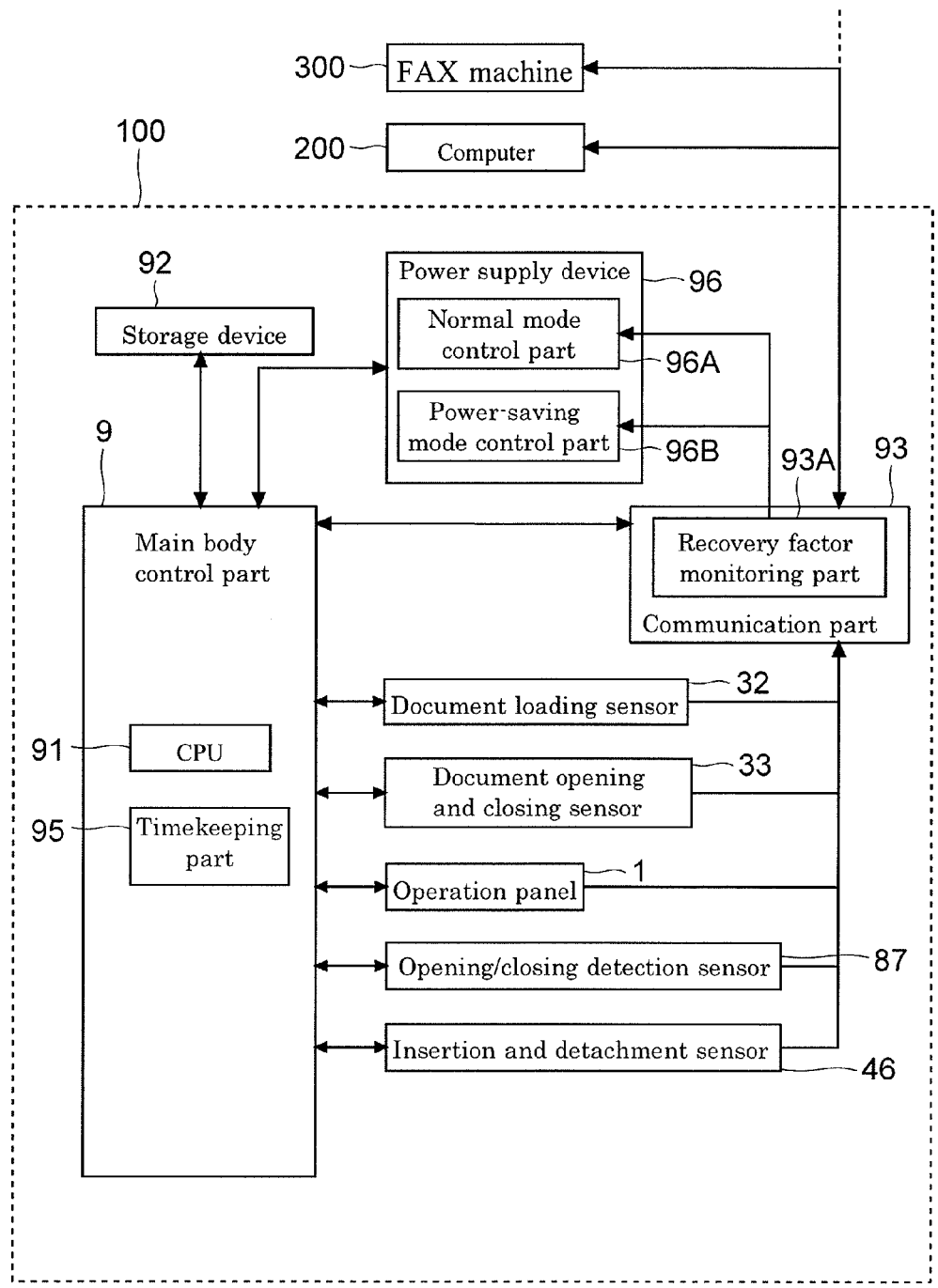
FIG. 4 is a block diagram showing one example of configuration related to transition between a normal mode and a power-saving mode of the MFP according to the first embodiment.

Next, based on FIG. 4, the normal mode and the power-saving mode in the MFP 100 according to the first embodiment of the invention will be described. FIG. 4 is a block diagram showing one example of configuration related to transition between the normal mode and the power-saving mode in the MFP 100 according to the first embodiment of the invention.

First, the MFP 100 of this embodiment has at least the normal mode and the power-saving mode. For example, in the normal mode, a power is supplied to the various parts including the main body control part 9 and the storage device 92 and also the paper feed parts 4a, the conveying path 4b, the image forming part 5, the intermediate transfer part 6, the fixing part 7, the communication part 93, etc. For example, in the fixing part 7, the temperatures of the heating roller 72, etc. are maintained at the printable temperature. In this manner, in the normal mode, the MFP 100 is maintained in a state in which it can be used immediately.

On the other hand, the power-saving mode is a mode that reduces consumed power more than the normal mode, and under fixed condition, the MFP 100 shifts from the normal mode to the power-saving mode. For example, the condition for the shift from the normal mode to the power-saving mode is that fixed time (for example, any of 5 to 90 minutes, which can be set on the operation panel 1) passes in a state in which the MFP 100 remains unused without any operation (for example, such as inputting to the operation panel 1) performed on the MFP 100. For example, a timekeeping part 95 that performs timekeeping is provided in the main body control part 9, so that the timekeeping part 95 performs the timekeeping. Moreover, for example, when the power-saving key 18 has been pressed on the operation panel 1, the shift from the normal mode to the power-saving mode may occur.

At this point, the power supply from the power supply device 96 to the main body control part 9, the image forming part 5, the intermediate transfer part 6, the fixing part 7, etc. is stopped. Consequently, the power consumption in the MFP 100 can be reduced. Then the voltages to be generated by the power supply device 96 and the amount of power supplied differ between the normal mode and the power-saving mode. Thus, provided in the power supply device 96 are: a normal mode control part 96A that controls operation of the power supply device 96 in the normal mode; and a power-saving mode control part 96B that controls operation of the power supply device 96 in the power-saving mode. For example, in a case of the shift from the normal mode to the power-saving mode, the main body control part 9 provides to the power supply device 96 instructions for driving the power supply device 96 by using the power-saving mode control part 96B.

In a case where a recovery factor (for example, a case where print data has been transmitted from the external computer 200 in the power-saving mode) occurs, the MFP 100 recovers from the power-saving mode to the normal mode. Here, since the power supply to the main body control part 9 is stopped in the power-saving mode, the main body control part 9 is not driving, and thus cannot recognize the occurrence of the recovery factor and provide the instructions to the various parts such as the power supply device 96 of the MFP 100. Thus, provided in the communication part 93 of the MFP 100 of this embodiment is, as shown in FIG. 4, for example, a recovery factor monitoring part 93A that monitors the occurrence of the factor of the recovery from the power-saving mode to the normal mode.

In the MFP 100 of this embodiment, for example, in a case where operation as described below has been made on the MFP 100, it is assumed that the recovery factor from the power-saving mode to the normal mode has occurred. Examples of the recovery factor are: a case where document loading has been detected by the document loading sensor 32; a case where the document opening and closing sensor 33 has detected that the document conveying device 3 has been opened; reception of print data from the external computer 200 or the like; inputting to the operation panel 1; withdrawal and insertion of the paper feed part 4a based on output of the insertion and detachment detection sensor 46; opening/closing of the side surface cover 86 based on output of the opening/closing detection sensor 87; etc. To the portions detecting such factors (operation detection parts), the power is supplied from the power supply device 96 even in the power-saving mode.

The operation panel 1 and the detection parts such as the insertion and detachment detection sensor 46 and the opening/closing detection sensor 87 are connected to the recovery factor monitoring part 93A and the main body control part 9. Through these connections, the recovery factor monitoring part 93A can recognize the occurrence of the recovery factors. Moreover, the main body control part 9 can recognize, for example, opening/closing of the side surface cover 86 and the document conveying device 3 in the normal mode.

If the recovery factor occurs, the shift from the power-saving mode to the normal mode occurs. At this point, the recovery factor monitoring part 93A provides to the power supply device 96 instructions for driving the power supply device 96 by using the normal mode control part 96A. Consequently, the power supply to the main body control part 9, the fixing part 7, etc. is restarted, thereby starting warm-up for bringing about a state in which the MFP 100 is usable. As described above, the MFP 100 has the normal mode and the power-saving mode that reduces the power consumed in the image forming apparatus more than the normal mode. Then in the power-saving mode, fixing temperature control that maintains the heating part at the printable temperature is not performed, and upon the shift (recovery) from the power-saving mode to the normal mode, the control that maintains the heating part at the printable temperature is performed.

(Outline of Fixing Temperature Control)

Figure 5:
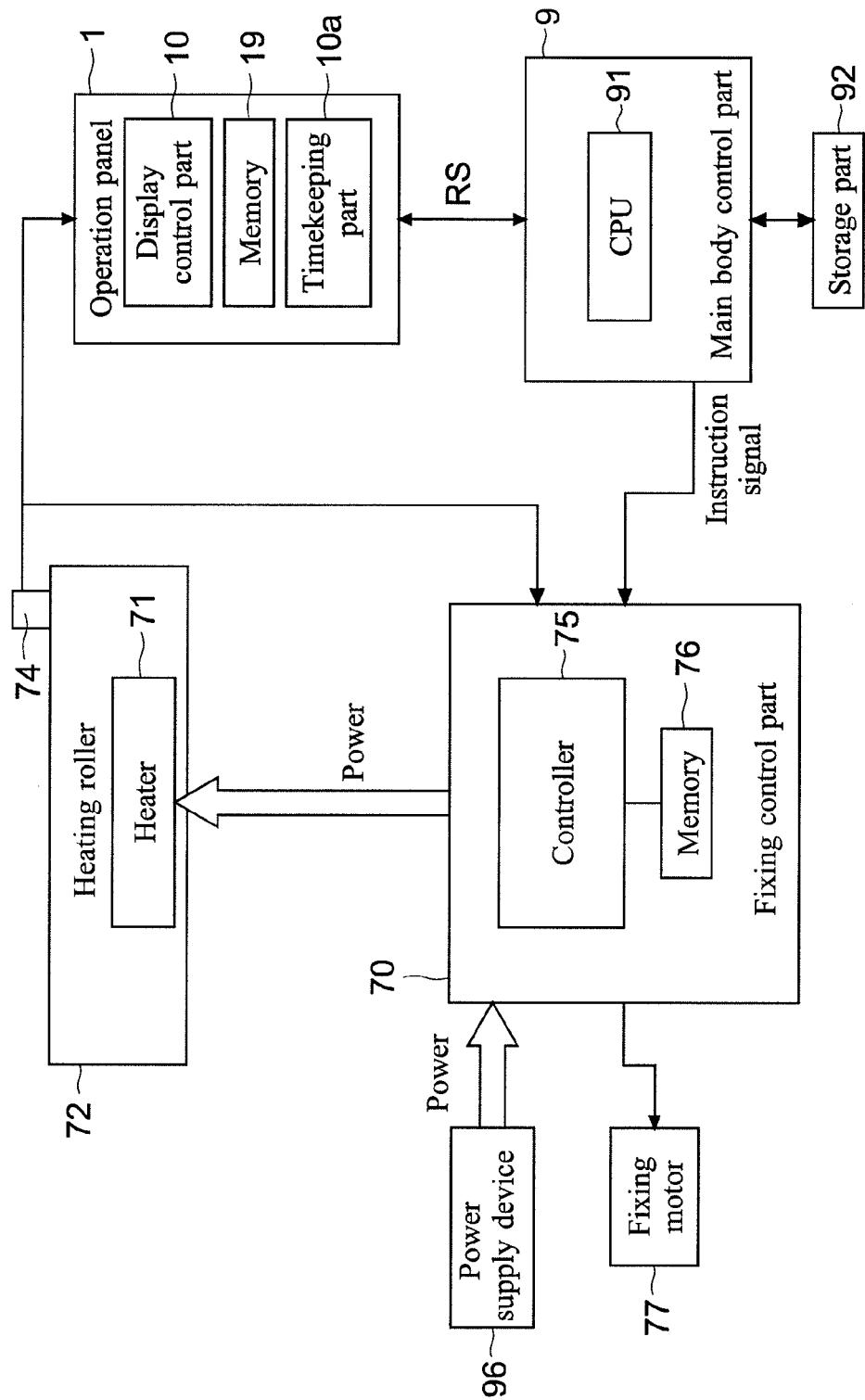
FIG. 5 is a block diagram describing one example of hardware configuration related to heating control of a fixing-part according to the first embodiment.

Next, referring to FIG. 5, one example of heating control performed at time of the recovery to the normal mode in the MFP 100 according to the first embodiment of the invention will be described. FIG. 5 is a block diagram illustrating one example of hardware configuration related to the heating control in the fixing part 7 according to the first embodiment of the invention.

In the power-saving mode, heating at the fixing part 7 is not performed. Therefore, upon the shift to the power-saving mode, the temperatures of the heating roller 72, the pressure roller 73, etc. decrease from the printable temperature towards a room temperature through heat radiation. On the other hand, at the time of the recovery to the normal mode, the warm-up that increases the temperatures of the heating roller 72, etc. up to the printable temperature is performed. Note that, when a main power source of the MFP 100 is turned ON (for example, upon startup), the warm-up is also performed in order to turn the MFP 100 into a usable state.

The temperature control of the fixing part 7 may be performed by the main body control part 9, but as shown in FIG. 5, the fixing part 7 of this embodiment is provided with a fixing control part 70 that performs the heating control of the fixing part 7. Then the fixing control part 70 performs the heating control in response to the instruction provided from the main body control part 9. For example, the fixing control part 70 has: a controller 75 as a control element; and a memory 76 that stores a program and data for the fixing control. The controller 75 performs the actual heating control.

Moreover, in order to conduct heat to the entire fixing part 7 at time of the warm-up and then convey paper at time of printing, the heating roller 72 and the pressure roller 73 need to be rotated. To this end, a fixing motor 77 is provided which rotates the heating roller 72, etc. The fixing control part 70 controls the rotation of the fixing motor 77 and rotates the heating roller 72, etc. when necessary.

Moreover, for example, the fixing control part 70 performs switching between applying the power supplied from the power supply device 96 to the heater 71 and not applying the power supplied from the power supply device 96 to the heater 71 (turning ON and OFF of the power distribution to the heater 71). The fixing control part 70 receives from the main body control part 9 instruction signals (for example, a serial data signal) that indicates details of the control at the fixing part 7 (for example, whether or not to heat the fixing part 7 and a temperature at which the fixing part 7 should be maintained). The fixing control part 70 introduces power to the heater 71 when heat ON instructions has been provided.

Moreover, the main body control part 9 makes the controller 75 to introduce the power to the heater 71 for consumption (for heat exchange). However, since an excessive increase in the temperature of the fixing part 7 possibly causes fixing failure or malfunction, for temperature maintenance control of the fixing part 7, for example, the temperature sensor 74 is provided in such a manner as to make contact with an end part of the heating roller 72. Note that the temperature sensor 74 may be plurally provided, for example, with respect to an axial direction of the heating roller 72 as a center while making no contact with each other.

Then a voltage outputted by the temperature sensor 74 is inputted to the fixing control part 70. For example, stored into the memory 76 in the fixing control part 70 is a data table defining a temperature for the voltage outputted by the temperature sensor 74 and a resistance value of a thermistor. Based on this data table, the fixing control part 70 can detect the temperature of each part of the heating roller 72. This permits the fixing control part 70 to maintain the temperature of the fixing part 7 at the printable temperature in the normal mode while performing turning ON/OFF of the power distribution to the heater 71.

Moreover, as shown in FIG. 5, the voltage outputted by the temperature sensor 74 is also inputted to the operation panel 1. For example, stored into the memory 19 of the operation panel 1 is the data table defining the temperature for the voltage outputted by the temperature sensor 74 and the resistance value of the thermistor. Based on this data table, the display control part 10 can detect and recognize the temperature of the heating roller 72.

(Outline of Work Flow Calling and Usage)

Next, referring to FIG. 6, the outline and usage of the work flow according to the first embodiment of the invention will be described. FIG. 6 are explanatory diagrams showing one example of a flow of displaying the work flow in a wizard format according to the first embodiment of the invention.

The MFP 100 of this embodiment has a large number of settable functions and various setting items. Then the liquid crystal display part 11 displays a selection screen for selecting, from among a plurality of setting items, the setting item for which a setting is to be made, and the user selects (presses) the setting item (function) for use in printing or transmission. For example, the liquid crystal display part 11 displays each setting item as a key. Moreover, the liquid crystal display part 11 displays each setting screen S for the selected setting item. The user can press, for example, a key displayed on each setting screen S or a hard key arranged around the liquid crystal display part 11 to make various function selections and settings. Kinds of the setting items and their setting screens S are large in number, and thus their illustration will be omitted unless described below for convenience and the settable functions (setting items) will be just listed below.

First, in a case where the MFP 100 is used for copying (a copy mode is brought by pressing the copy key 15a), the setting items prepared for the MFP 100 are: for example, document image quality (character, photo, character+photo, etc.), copy density, paper selection, magnification, economical printing, a binding margin, center shifting, frame deletion, double-sided/divided (one-sided→double-sided, double-sided→one-sided, two-facing pages→double-sided, etc.), a booklet, covering, a document setting direction, a document size, sorting, classification, black and white reversal, mirror image printing, paging, image synthesis, integration (2 in 1, 4 in 1, etc.), margin addition, continuous reading and batch printing, trial copying, recopying, stapling, punching, etc. The user, through inputting onto the setting screen S for each setting item displayed at the liquid crystal display part 11, sets the setting value in the setting item.

Next, in a case where the MFP 100 is used as a scanner (the MFP 100 can be used as the scanner by pressing the transmit key 15b), the setting items prepared for the MFP 100 are: for example, a document size, a transmission size, resolution, a document setting direction, a saved file format, image quality (density, a color mode, a compression rate, image quality of a document such as a photo, a character, or the like, etc.), division, frame deletion, page-by-page outputting, continuous reading, file name inputting, center shifting, destination selection, destination registration, a password, E-mail transmission, opposite-side reception confirmation, etc. The user, through inputting onto the setting screen S for each setting item displayed at the liquid crystal display part 11, sets the setting value in the setting item.

Next, in a case where the MFP 100 is used for faxing (the MFP 100 can be used as a FAX by pressing the transmit key 15b), the setting items prepared for the MFP 100 are: for example, local station registration (a Fax number, ID, etc.), direct transmission, memory transmission, rotary communication, batch transmission, F code communication, reception in paper-out condition, an abbreviated number, document density, a document size, destination selection, destination registration, redialing, double-sided transmission, zoomed-out/in transmission, reserved transmission, interrupt transmission, time-specified communication, polling communication, relay transmission, received image data transfer, encrypted communication, communication result notification, paper size confirmation, integration (2 in 1, etc.), double-sided reception, etc. The user, through inputting onto the setting screen S for each setting item displayed at the liquid crystal display part 11, sets the setting value in the setting item.

Here, some of the setting items are frequently combined together upon the usage of the MFP 100 by the user; for example, in a case where integration and double-sided are set in combination for the purpose of reducing paper consumption, and the transmission method and the destination of the image data obtained by reading at the image reading part 2 are combined. Moreover, some of the setting items are representative ones frequently used. However, as described above, a wide variety of setting items (functions) are provided in the MFP 100, and making the same settings for the plurality of setting items upon every usage of the MFP 100 brings about complicatedness and inconvenience. Users not familiar with the settings at the MFP 100 in particular may have trouble operating the MFP 100.

Thus, the MFP 100 of this embodiment can previously store combinations of the frequently used setting items as a work flow. Then the user calls the work flow (a program including data indicating the previously selected setting items, display order, and a display format) stored in the storage device 92 or the memory 19, upon which a screen for making a setting for the previously selected setting item is displayed at the liquid crystal display part 11. For example, the work flow includes approximately 10 setting items (may be more than 10 or less than 10).

For the work flow, a work flow created by a manufacturer may be stored as a default in the storage device 92 and the memory 19. Moreover, the user may create a work flow through inputting to the operation panel 1. Consequently, in accordance with the actual condition of the setting item to be used, a setting based on the work flow can be made, making use of the work flow function.

Next, a display and a setting provided upon the work flow calling will be described. A display format prepared for a screen for making a setting when the work flow has been called is a wizard format (interactive type). In other words, the setting items included in the work flow are displayed in sequence upon every setting. This permits settings to be made interactively, so that even a beginner can make the settings without any error.

Figure 6A:
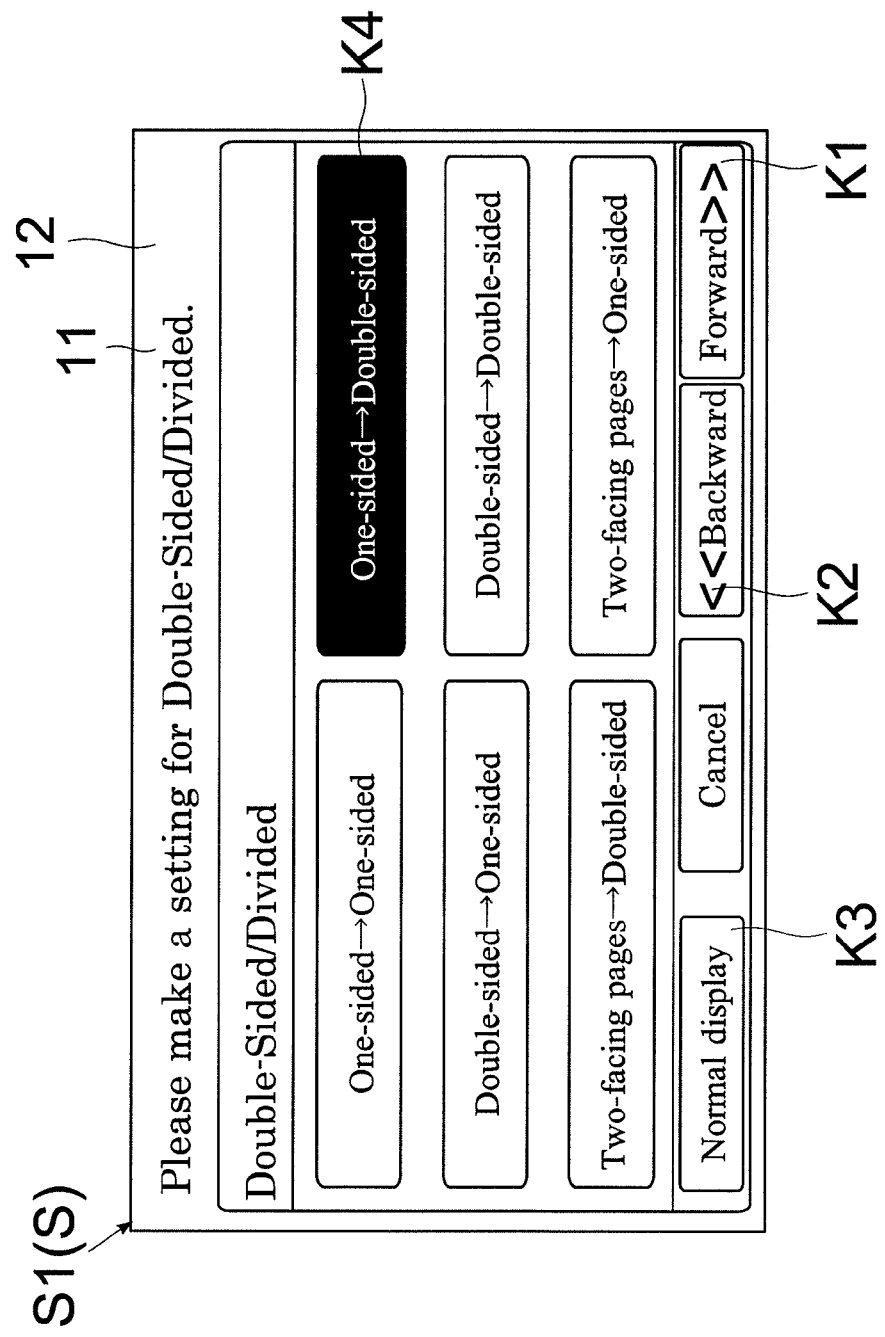
FIG. 6A is an explanatory diagram showing one example of a flow of displaying a work flow in a wizard format according to the first embodiment.
Figure 6B:
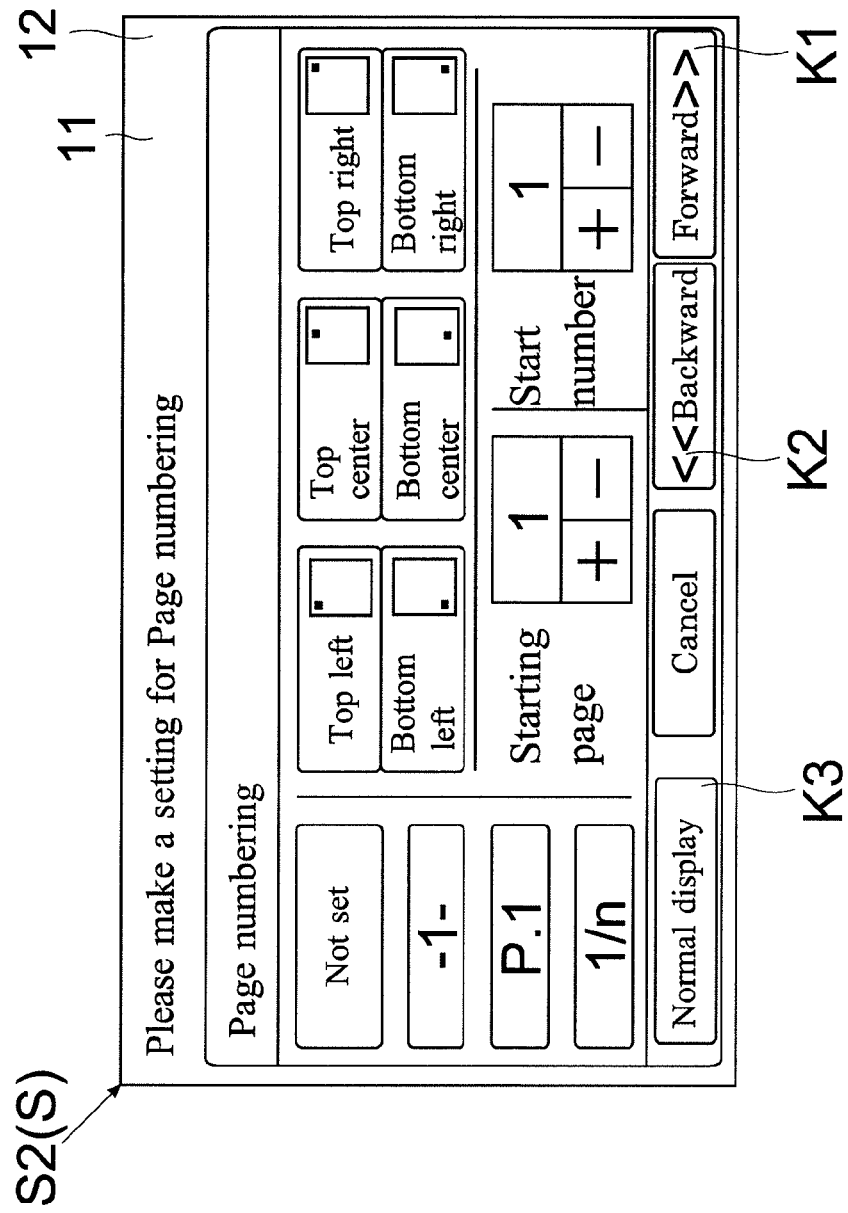
FIG. 6B is an explanatory diagram showing one example of the flow of displaying the same in the wizard format.
Figure 6C:
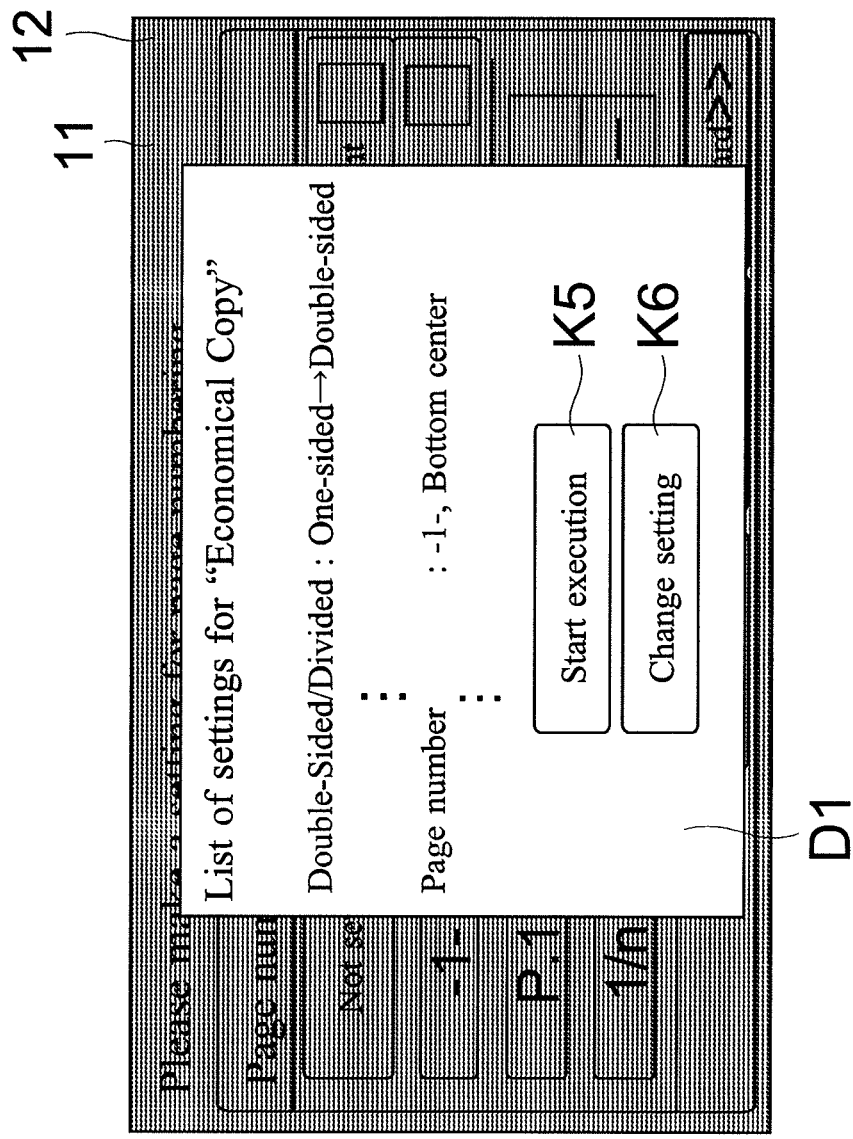
FIG. 6C is an explanatory diagram showing one example of a setting list provided upon the display performed in the wizard format.

Referring to FIG. 6, the wizard display format in the work flow will be described. For example, FIGS. 6A to 6C show one example of the work flow related to copying. The work flow shown in FIG. 6 is created and registered in a manner such as to include the setting items "Double-Sided/Divided" shown in FIG. 6A and "Page numbering" shown in FIG. 6B, and the other setting items. Moreover, the work flow is prepared and registered in a manner such that the setting screens S for the respective setting items are displayed in order of the setting screen S1 for "Double-Sided/Divided" shown in FIG. 6A and the setting screen S2 for "Page numbering" shown in FIG. 6B.

Other than "Double-Sided/Divided" and "Page numbering", there are a large number of setting items including: as described above, the number of copies to be printed, the density, zooming out/in, the integrated printing, the image quality (photo or character), etc., but they are omitted from the illustration and an arrow of a broken line is provided to indicate the omission.

A forward key K1 and a backward key K2 are arranged on each setting screen S. When the forward K1 has been pressed, the liquid crystal display part 11 displays the setting screen S for the following setting item. When the backward key K2 has been pressed, the liquid crystal display part 11 displays the setting screen S for the last setting item. The user, by pressing the setting key arranged on each setting screen S, can set a set value for each setting item. For example, as shown in FIG. 6A, the key pressed for the setting is displayed with black and white inverted (white characters on black background).

Moreover, on each setting screen S, a normal display key K3 is provided. When the normal display key K3 has been pressed, the liquid crystal display part stops its display in the wizard format. Then the liquid crystal display part displays a selection screen displaying the setting items arranged in parallel so that the user can arbitrarily select each setting item. In this manner, on the operation panel 1 of this embodiment, both display in the wizard format and display not in a wizard format can be performed.

In the work flow, upon the display of each setting screen S, a default value of the selected and set setting value can be defined. This default value is stored into the storage device 92, etc. as part of the work flow. For example, in a case where the work flow has been prepared so that "One-Sided→Double-Sided" is a default value in Double-Sided/Divided, when the setting screen S1 is displayed for the first time, a one-sided→double-sided key K4 is displayed in an already-selected state at the liquid crystal display part 11, as shown in FIG. 6A.

Then when the forward key K1 has been pressed on the setting screen S for the last setting item of the setting items preregistered as the work flow, the liquid crystal display part 11 displays a setting list D1 shown in FIG. 6C. Displayed on this setting list D1 are the setting items included in the work flow and the setting values in the respective setting items. Also displayed on the setting list D1 are an execution start key K5 and a setting change key K6. When the execution start key K5 has been pressed, details shown on the setting list D1 are transmitted from the operation panel 1 to the main body control part 9, which controls the MFP 100 based on the recognized details, whereby copying is performed. When the setting change key K6 has been pressed, for example, the setting screen S1 for "Double-Sided/Divided" is displayed again, so that the user can make the setting again for the setting item included in the work flow.

(Display Setting at time of Recovery from Power-Saving Mode to Normal Mode)

Figure 7:
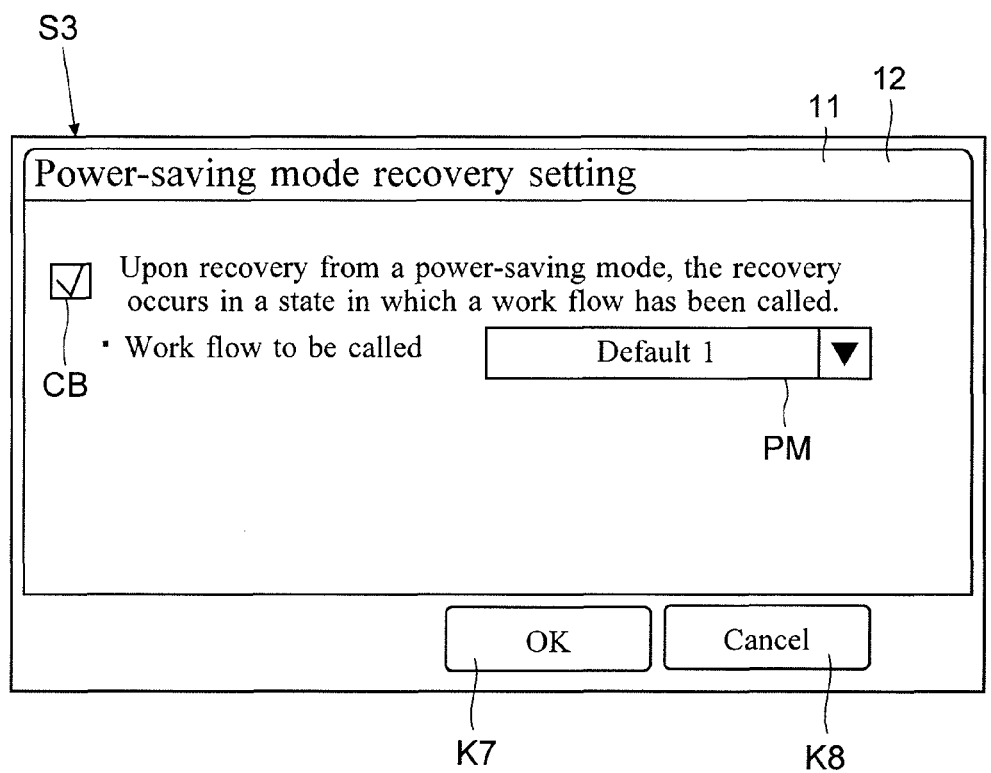
FIG. 7 is an explanatory diagram showing one example of a setting screen displayed at time of recovery from the power-saving mode to the normal mode according to the first embodiment.

Next, referring to FIG. 7, one example of the display setting at the time of the recovery from the power-saving mode to the normal mode in the MFP 100 according to the first embodiment of the invention will be described. FIG. 7 is an explanatory diagram showing one example of a displayed setting screen S3 provided at the time of the recovery from the power-saving mode to the normal mode according to the first embodiment of the invention.

In the MFP 100 of this embodiment, it can be defined whether, upon the recovery from the power-saving mode to the normal mode, the recovery occurs in a state in which the work flow has been called at the liquid crystal display part 11 or the recovery occurs in a state in which the work flow has not been called there.

The state in which the work flow has not been called corresponds to a case where a setting is made without use of the work flow. In this case, as is the case with a case where the normal display key K3 has been pressed, the selection screen displaying the setting items arranged in parallel is displayed so that the user can arbitrarily select the setting item. When the user has selected the setting item displayed as the key displayed on the selection screen, the setting screen S for the selected setting item is displayed, so that a setting value for the function to be set can be set. Then the setting item selection and setting value setting are repeated the number of times required.

For example, when predetermined operation has been made on the operation panel 1, the liquid crystal display part 11, upon the recovery from the power-saving mode to the normal mode, displays the display setting screen S3 for previously defining whether the recovery is to occur in the state in which the work flow has been called or in the state in which the work flow has been not called. FIG. 7 shows one example of this display setting screen S3.

On the display setting screen S3, a check box CB for defining whether or not, at the time of the recovery from the power-saving mode, the recovery is to occur in the state in which the work flow has been called at the liquid crystal display part 11 is displayed. For example, the user presses the check box CB and then puts a check mark therein. Then the liquid crystal display part 11, at the time of the recovery from the power-saving mode, provides a display in the state in which the work flow has been called.

Moreover, in a case where a plurality of work flows are stored, a pull down menu PM is provided for defining which work flow is to be displayed at the liquid crystal display part 11 for the recovery from the power-saving mode. The user can operate the pull down menu PM to thereby define the work flow to be displayed at the liquid crystal display part 11 at the time of the recovery from the power-saving mode.

Then on the display setting screen S3, an OK key K7 and a cancel key K8 are provided. When the OK key K7 has been pressed, in accordance with the setting on the display setting screen S3, whether or not to recover from the power-saving mode in the state in which the work flow has been displayed at the liquid crystal display part 11 and data indicating the work flow to be displayed are saved into the memory 19 (or may be saved into the storage device 92). When the cancel key K8 has been pressed, the setting on the display setting screen S3 is canceled.

(Outline of Fixing Temperature Control at time of Recovery from Power-Saving Mode to Normal Mode)

Figure 8:
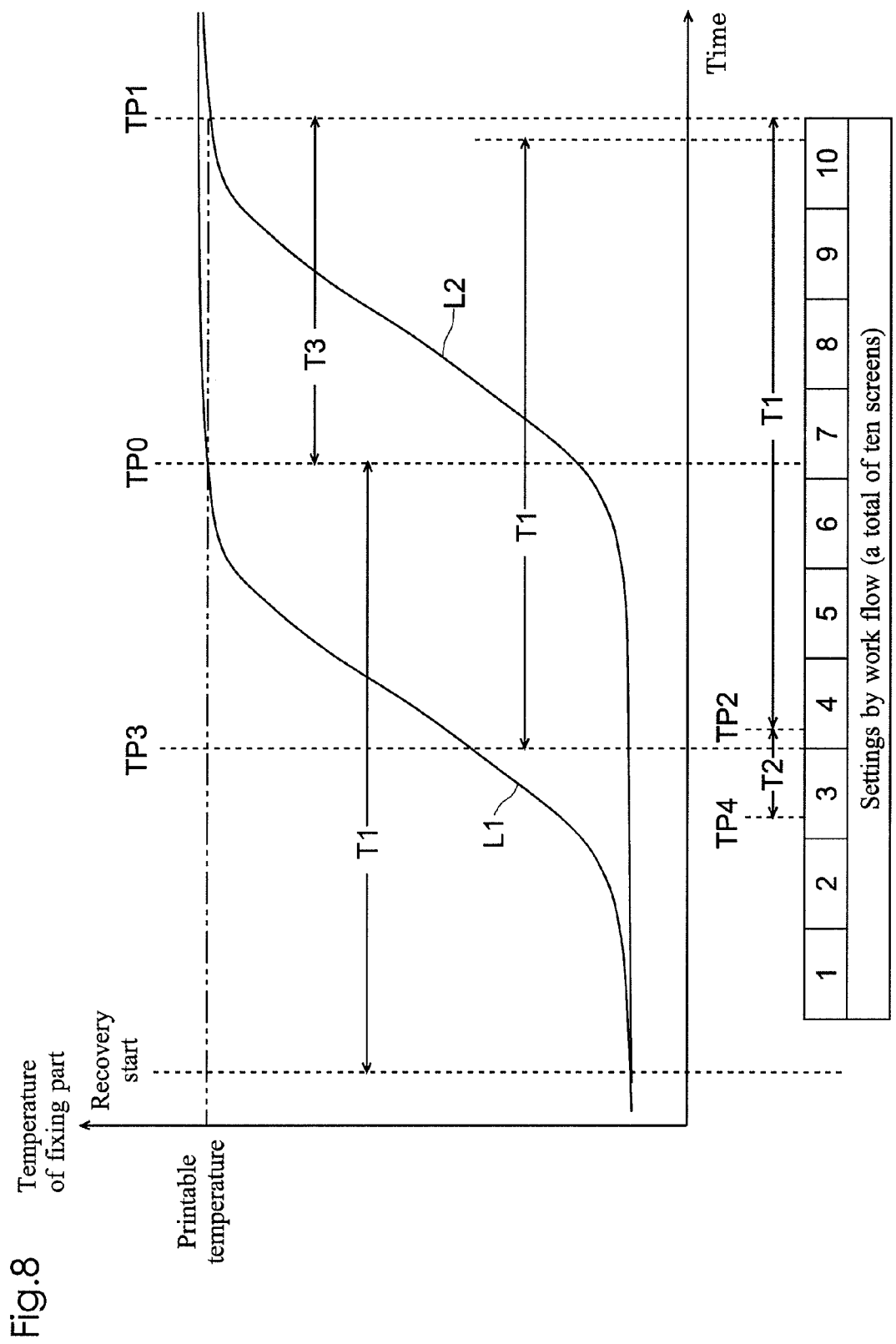
FIG. 8 is a graph illustrating fixing temperature control performed at the time of the recovery from the power-saving mode to the normal mode according to the first embodiment.

Next, based on FIG. 8, the outline of the fixing temperature control at the time of the recovery from the power-saving mode to the normal mode according to the first embodiment of the invention will be described. FIG. 8 is a graph illustrating the fixing temperature control at the time of the recovery from the power-saving mode to the normal mode according to the first embodiment of the invention.

First, a horizontal axis of the graph shown in FIG. 8 is a temporal axis. A vertical axis of the graph shown in FIG. 8 indicates the temperature of the fixing part 7. Then FIG. 8 shows one example of a temperature change of the fixing part 7 in the fixing temperature control of the fixing part 7. Specifically, FIG. 8 shows a temporal change in the temperature of the fixing part 7 when the fixing part 7 is warmed, at time of for example, the recovery to the normal mode, from a state in which the fixing part 7 is cool (for example, at the room temperature) up to the printable temperature (for example, approximately 170 to 200 degrees Celsius, depending on a factor, for example, characteristics of the toner used).

In FIG. 8, a temperature curve L1 indicates one example of a temperature change of the heating roller 72 in a case where the power distribution to the heater 71 of the fixing part 7 is started immediately after startup of the main body control part 9 and the heating roller 72, etc. are rotated while being warmed up upon main power supply introduction or the recovery from the power-saving mode. In other words, the temperature curve L1 is one example of a case where the fixing temperature control is started as soon as possible, for example, at the time of the recovery from the power-saving mode.

Shown in a band form along the horizontal axis at the bottom of the graph of FIG. 8 is one example of time required for completion of making the work flow settings in a case where the liquid crystal display part 11 calls and displays the work flow upon the recovery from the power-saving mode. Shown in the example of FIG. 8 is an example in which a work flow having ten screens from the first setting screen S to the setting list D1 has been called in the wizard format.

In making the settings in the wizard format, fixed time is required for completion of making the settings. Thus, as shown by the temperature curve L1 of the FIG. 8, before making the work flow settings is completed, the fixing part 7 may reach the printable temperature (in the example shown in FIG. 8, reaches the printable temperature at a time point TP0 during the setting made on the seventh screen). Then in the example shown in FIG. 8, between the seventh screen and the tenth screen (during T3), the power distribution to the heater 71 is required in order to avoid a temperature decrease at the fixing part 7 and maintain the fixing part 7 at a printable state. However, the power distribution between the seventh screen and the tenth screen is wasteful.

Thus, in the MFP 100 of this embodiment, the fixing temperature control is started with reference to a time point TP2 (corresponding to a first time point) reached by tracing back by time required for stabilizing the temperature of the fixing part 7 at the printable temperature (required stabilization time T1) from a predicted time point TP1 at which making the work flow settings in the wizard format are predicted to complete. In the example of FIG. 8, for example, at a time point TP3 between the third screen and the fourth screen (at a time point at which making the setting on the third screen ends), the main body control part 9 starts the fixing temperature control. Then one example indicating transition of the temperature of the fixing part 7 when the fixing temperature control is delayed is a temperature curve L2. Note that in the graph shown in FIG. 8, a length of the required stabilization time T1 is constant, that is, equal for the temperature curves L1 and L2.

Indicated in the example shown in FIG. 8 is an example where the fixing temperature control is restarted at a time point at which the setting screen S has just switched. Thus, to judge whether or not to restart the fixing temperature control when the setting screen S has switched, the fixing temperature control may be restarted upon switching of the setting screen S located between the time point TP2 and a time point TP4 (corresponding to a second time point) reached by further tracing back by one setting screen S (corresponding to necessary time T2) from the time point TP2.

Consequently, when the last screen of the setting screens in the wizard format is displayed, the temperature of the fixing part 7 can be brought to the printable temperature with no waste of power (the tenth screen in the example of FIG. 8). Moreover, for the temperature of the fixing part 7, the print job can be started at the necessary time T2 or at the same time as the completion of making the settings in the wizard format. Note that the fixing temperature control does not have to be started at the time point at which the setting screen S has switched. At the time point TP2, the fixing temperature control may be restarted.

As described above, by delaying the start of the fixing temperature control, the temperature of the fixing part 7 is brought to the printable temperature in synchronization with the time point at which making the settings in the wizard format has completed. Therefore, there is no unnecessary maintenance of the temperature of the fixing part 7 compared to a case when the fixing temperature control starts immediately after the main power source is introduced or the recovery from the power-saving mode. Specifically, as shown in FIG. 8, power consumed at the time T3 from the seventh screen to the time point at which making the settings in the wizard format ends is saved.

(Control at time of Recovery from Power-Saving Mode)

Figure 9:
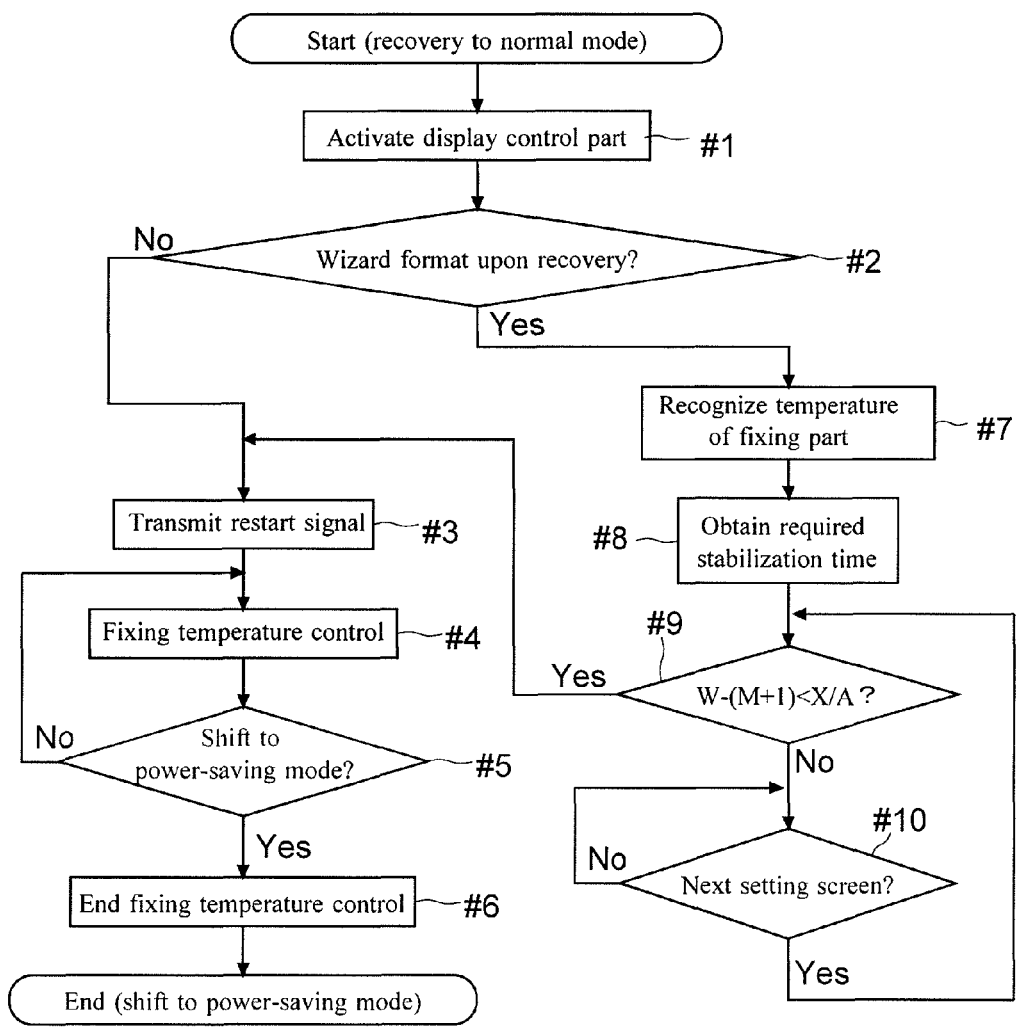
FIG. 9 is a flow chart showing one example of the fixing temperature control performed at the time of the recovery from the power-saving mode to the normal mode according to the first embodiment.

Next, based on FIGS. 9 and 10, one example of the fixing temperature control at the time of the recovery from the power-saving mode to the normal mode according to the first embodiment of the invention will be described. FIG. 9 is a flow chart showing one example of the fixing temperature control at the time of the recovery from the power-saving mode to the normal mode according to the first embodiment of the invention. FIG. 10A shows one example of required stabilization time data for defining a time point at which the fixing temperature control starts according to the first embodiment of the invention, and FIG. 10B shows one example of the same necessary time data.

First, start of FIG. 9 corresponds to a time point at which a recovery factor occurs in the power-saving mode, for example, in a case where inputting to the operation panel 1 has been performed. Next, the recovery from the power-saving mode to the normal mode is started (the power supply from the power supply device 96 to the various parts in the MFP 100 is restarted), and the various parts such as the display control part 10 and the main body control part 9 are activated (step #1).

Next, the display control part 10 checks if the setting is calling the work flow and providing a display in the wizard format upon the recovery from the power-saving mode (step #2). If the setting screen S in the wizard format is not to be displayed at the liquid crystal display part 11 upon the recovery from the power-saving mode (No in step #2), job start instructions may be provided immediately, and thus the display control part 10 transmits towards the main body control part 9 a restart signal RS for restarting the fixing temperature control at the fixing part 7 (step #3).

Specifically, the input part (for example, the touch panel 12), upon the restart of the fixing temperature control, receives input for displaying the setting screen S in a display format other than the wizard format, and upon the restart of the fixing temperature control from a state in which the fixing temperature control is stopped, in a case where the display is provided in a display format other than the wizard format, the control part (display control part 10) issues the restart signal RS in synchronization with the recovery to the normal mode. Also in a case where the normal display key K3 (see FIGS. 6A and 6B) has been pressed on each setting screen in the wizard format, the display control part 10 may immediately issue the restart signal RS.

The main body control part 9, upon reception of the restart signal RS, gives the fixing control part 70 instructions for starting the fixing temperature control, and the fixing temperature control at the fixing part 7 is started (step #4). Then until a condition for the shift to the power-saving mode is met (for example, the passage of predetermined time while no operation is performed in the MFP 100), the fixing temperature control is performed (step #5, No in step #5). Then if the condition for the shift to the power-saving mode is met, the fixing temperature control ends (step #6→End).

On the other hand, if the setting is calling the work flow and then performing display in the wizard format upon the recovery from the power-saving mode (Yes in step #2), the display control part 10, based on the output (voltage) of the temperature sensor 74, recognizes the temperature of the fixing part 7 (heating roller 72). Then using the required stabilization time data for obtaining the required stabilization time T1 as shown in FIG. 10A, the display control part 10 obtains the required stabilization time T1 (step #8).

For example, the required stabilization time data is a table defining the required stabilization time T1 for different temperatures in steps of fixed temperatures (a step width is 5 degrees Celsius in the example shown in FIG. 10A). That is, the storage parts (memory 19 and the storage device 92) store as the required stabilization time data the table defining the required stabilization time T1 for the different current temperatures of the fixing part 7. The required stabilization time T1 varies depending on output of the heater 71, materials of the heating roller 72 and the pressure roller 73, etc.

Thus, for example, an average value of measured time required for warming the fixing part 7 up to the printable temperature in an experiment previously performed is included into the table of required stabilization time as the required stabilization time T1. Note that the required stabilization time data may be a calculating formula for obtaining the required stabilization time T1 from the current temperature of the fixing part 7. If the temperature of the fixing part 7 is between the temperatures of the fixing part 7 in the different steps, the display control part 10 may obtain the required stabilization time T1 through interpolation computing or may treat, as the required stabilization time T1 for the current temperature of the fixing part 7, a value of the required stabilization time T1 for the closest temperature in the table.

Next, the display control part 10, by using the necessary time data indicating approximate time required for making a setting on one screen in the settings made in the wizard format, checks if the next computing can be satisfied (step #9). The storage parts (memory 19 and the storage device 92) store the fixed value as the necessary time data.

$$W-(M+1) \leq X/A \qquad \text{(Formula 1)}$$

where

W denotes the number of screens until completion of making the settings in the wizard format (the number of remaining screens);

M denotes a position in all setting screens S in the wizard format (placement of the screen);

X denotes the required stabilization time T1 (required stabilization time data) (in seconds); and A denotes the necessary time T2 (necessary time data) (in seconds).

X/A is a value obtained by dividing the required stabilization time T1 by the necessary time T2. For example, where A=2 (two seconds per screen) and X=10 (in this case, ten seconds until the printable temperature), X/A is 5. Moreover, W=10 (all the screens displayed in the wizard format), and where M=1 (the first screen), W−(M+1)=8, which does not satisfy the (Formula 1) (No in step #9).

On the other hand, the same applies to X, A, and W, and where W=10 (all the screens displayed in the wizard format) and M=5 (the screen currently displayed is the fifth screen), W−(M+1)=4, which satisfies the (Formula 1) (Yes in step #9).

If the (Formula 1) is satisfied (Yes in step #9), the processing proceeds to step #3 so that the fixing part 7 reaches the printable temperature by the completion of making the settings in the wizard format, and the display control part 10 issues the restart signal RS. In other words, in this embodiment, the display control part 10, by the (Formula 1), determines a time point at which the restart signal RS is issued.

Note that the (Formula 1) is a formula for judging whether or not to issue the restart signal RS at the time of switching the setting screen S, but the invention is not limited to the (Formula 1). For example, the display control part 10 may issue the restart signal RS at a time point where A×W−X=0 while sequentially changing the value of W.

Specifically, the image forming apparatus (for example, MFP 100) of the invention has: the operation part (operation panel 1) including the input parts (touch panel part 12, etc.) for inputting settings related to the image forming apparatus and the display part (liquid crystal display part 11) that displays the setting screens for the plurality of predefined functions in the wizard format in which they are sequentially displayed in an interactive manner; the control part (display control part 10) that recognizes the inputting of the settings at the input parts; the fixing part 7 which has therein the heater 71 for the purpose of fixing a toner onto paper, which performs the fixing temperature control for maintaining the temperature at the printable temperature as the temperature required for fixing the toner, and also which stops the fixing temperature control by shifting to the power-saving mode under a condition that predefined time has passed while no inputting was made on the input part, a condition that instructions for shifting to the power-saving mode has been given to the input part, or both conditions; the temperature detector (temperature sensor 74) for detecting the temperature of the fixing part 7; and storage parts (memory 19 and the storage device 92) which store at least: the required stabilization time data for defining the required stabilization time T1 as the time required for reaching the printable temperature when the fixing temperature control has been performed starting at the current temperature of the fixing part 7; and the necessary time data for defining the necessary time T2 required for making a setting for one of the setting screens S in the wizard format. Upon the recovery from the power-saving mode to the normal mode since inputting to the input part has been performed and/or the operation detection part (the various sensors such as the opening/closing detection sensor 87) has detected that the operation on the image forming apparatus has been performed and then restart of the fixing temperature control from a state in which the fixing temperature control is stopped, the control part obtains required stabilization time T1 based on a current temperature of the fixing part based on the output of the temperature detector and required stabilization time data, and based on the necessary time data and the number of remaining setting screens S on which settings need to be made in the wizard format, issues a restart signal RS for restarting the fixing temperature control between a first time point as a time point reached by tracing back by the required stabilization time T1 from a predicted time point TP1 at which making the settings are predicted to complete and a second time point as a time point traced back by the necessary time T2 from the first time point, and the fixing part 7 restarts the fixing temperature control after the restart signal RS has been issued.

More specifically, in this embodiment, the control part (display control part 10) issues the restart signal RS when a value obtained by subtracting from the total number of setting screens S in the wizard format a value obtained by adding 1 to the number of setting screens S displayed in the wizard format from the beginning to the currently displayed screen has become smaller than a value obtained by dividing the obtained required stabilization time T1 by the necessary time T2 defined by the necessary time data.

If the (Formula 1) is not satisfied (No in step #9), the display control part 10 continuously checks if switching to the next setting screen S has occurred as a result of pressing the forward key (step #10, No in step #10). If the switching to the next setting screen S has occurred (Yes in step #10), for example, the processing returns to step #9 (or may return to step #7). That is, the control part (display control part 10) defines (judges) whether or not to issue the restart signal RS every time the setting screen S in the wizard format is switched.

As described above, according to the invention of the first embodiment, upon the recovery to the normal mode, the time point at which a job is started as a result of the completion of making the settings in the wizard format can be brought closer to the time point at which the fixing part 7 reaches the printable temperature. This therefore can reduce waste of power consumed from when the fixing part 7 has been warmed up to the printable temperature to when the job starts following the completion of making the settings in the wizard format.

Moreover, under the influence of time required for making the setting on each setting screen S in the wizard format, the restart signal RS is issued. For example, in a case where making the setting on the setting screen S in the wizard format before the restart of the fixing temperature control has been elongated, the issue of the restart signal RS from the control part (display control part 10) is delayed. Therefore, since the restart signal RS is issued in view of the time actually required for making the setting on each setting screen S in the wizard format, the time point at which the job is started as a result of the completion of making the settings in the wizard format can be more precisely brought closer to the time point at which the fixing part 7 reaches the printable temperature.

With reference to the table, the required stabilization time T1 can be defined immediately. Moreover, a time point at which the fixing temperature control at the fixing part 7 is restarted can be defined easily.

In some cases, if the display format is not the wizard format, the time point at which the print job starts cannot be predicted, and immediately after switching of the display format from the wizard format to another display format, the instructions for starting the print job is given. Thus, in a case where display is performed in a display format other than the wizard format, the fixing temperature control at the fixing part 7 is restarted immediately upon the recovery to the normal mode. Therefore, even when inputting for executing the print job immediately after the recovery from the power-saving mode has been performed, the user has to wait only for short time.

Second Embodiment

Figure 11:
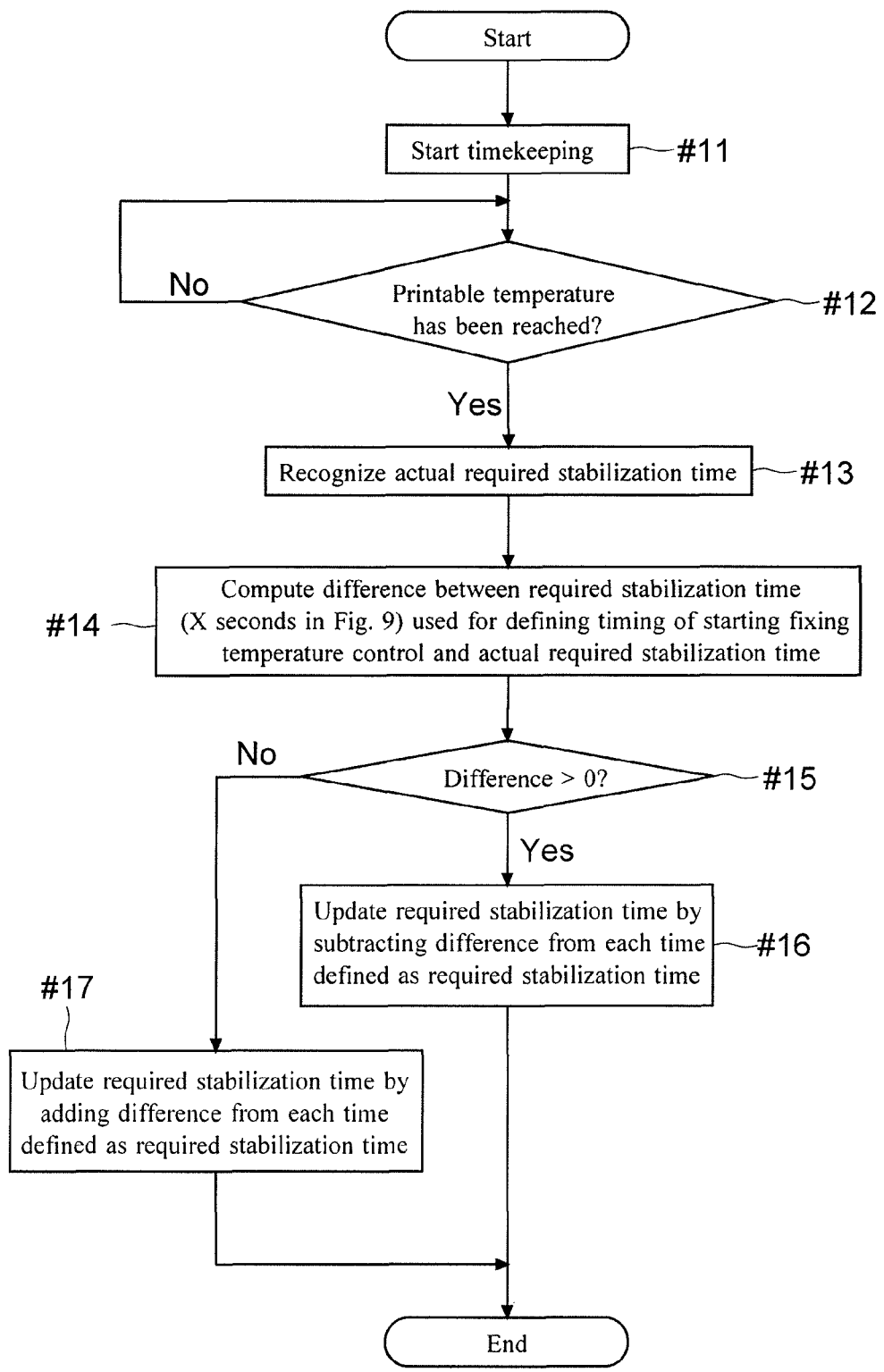
FIG. 11 is a flow chart showing one example of a flow of update control of the required stabilization time data in an MFP according to a second embodiment of the invention.
Figure 12:
FIG. 12 is an explanatory diagram showing one example of update of the required stabilization time in the MFP according to the second embodiment.

Next, based on FIGS. 11 and 12, one example of update of required stabilization time data in an MFP 100 according to a second embodiment of the invention will be described. FIG. 11 is a flow chart showing one example of a flow of update control of the required stabilization time data in the MFP 100 according to the second embodiment of the invention. FIG. 12 is an explanatory diagram showing one example of the update of the required stabilization time data in the MFP 100 according to the second embodiment of the invention.

Shown in the first embodiment is the example in which the required stabilization time data for obtaining the required stabilization time T1 from the start of the fixing temperature control to the warm-up to the printable temperature is fixed. However, the required stabilization time T1 depends on installation environment of the MFP 100. The required stabilization time T1 varies depending on inside and outside temperatures of the MFP 100 in particular in some cases. Thus, the required stabilization time T1 may vary depending on, for example, season.

Thus, in this embodiment, in accordance with the actual required stabilization time T1, the required stabilization time data is updated. Thus, one example of the flow of the update of the required stabilization time data will be described below. Note that other points may be similar to those of the first embodiment, and the same points will be omitted from description and illustration, and the description will be given by use of the same numerals as those of the first embodiment.

For example, start of FIG. 11 corresponds to a time point at which following the recovery from the power-saving mode, the display control part 10 issues the restart signal RS and then the fixing temperature control is started. Then upon the start of the fixing temperature control, the display control part 10 starts timekeeping (step #11). Specifically, the CPU in the display control part 10 may perform the timekeeping, or a timekeeping part 10a provided at the operation panel 1 as shown in FIG. 5 may be used.

Then the display control part 10 checks the output of the temperature sensor 74, and continuously checks if the temperature of the fixing part 7 has reached the printable temperature (step #12, No in step #12). If it has detected that the temperature has reached the printable temperature (Yes in step #12), the display control part 10 recognizes the actual required stabilization time T1 (step #13).

Then the display control part 10 obtains through computing a difference between the required stabilization time T1 (X seconds in the above description, see FIG. 9) used for defining the time point at which the fixing temperature control starts (timing of issuing the restart signal RS) and the actual required stabilization time T1 (step #14). If the difference is a positive value, the required stabilization time T1 used for defining the time point at which the fixing temperature control starts is longer than the actual required stabilization time T1. If the difference is a negative value, the required stabilization time T1 used for defining the time point at which the fixing temperature control starts is shorter than the actual required stabilization time T1.

Thus, the display control part 10 checks if the difference is positive (step #15), and if the difference is positive (difference>0) (Yes in step #15), the display control part 10 subtracts the difference from each value (each time) defined as the required stabilization time T1 for each temperature on the required stabilization time data to update the required stabilization time T1 (step #16). On the other hand, if the difference is not positive (difference≤0, including 0 for convenience, No in step #15), the display control part 10 adds the difference to each value (each time) defined as the required stabilization time T1 for each temperature on the required stabilization time data to update the required stabilization time T1 (step #17).

Specifically, the control part (display control part 10) recognizes time required for the fixing part 7 to actually reach the printable temperature when the fixing temperature control restarted, and if the obtained required stabilization time T1 is shorter than the time required to actually reach the printable temperature, makes the storage parts (memory 19 and storage device 92) update the value of the required stabilization time data in a direction in which the obtained required stabilization time T1 becomes shorter, and if the obtained required stabilization time T1 is longer than the time required to actually reach the printable temperature, makes the storage parts update the value of the table of the required stabilization time in a direction in which the obtained required stabilization time T1 becomes longer.

As a result, the required stabilization time data is updated as shown in FIG. 12. Note, however, that d in the required stabilization time T1 after the update of FIG. 12 is a difference between the required stabilization time T1 (X seconds in the above description, see FIG. 9) used for defining the time point at which the fixing temperature control starts (timing of issuing the restart signal RS) and the actual required stabilization time T1. Then after steps #16 and #17, the update of the required stabilization time T1 ends (END).

According to the second embodiment of the invention, since the start of the fixing temperature control, although the time required for the fixing part 7 to reach the printable temperature after the start of the fixing temperature control varies depending on factors such as season and installation environment (set temperature of air conditioning, etc.), the time point at which the job is started as a result of completion of making the setting in the wizard format can be precisely brought closer to the time point at which the fixing part 7 reaches the printable temperature.

Third Embodiment

Figure 13A:
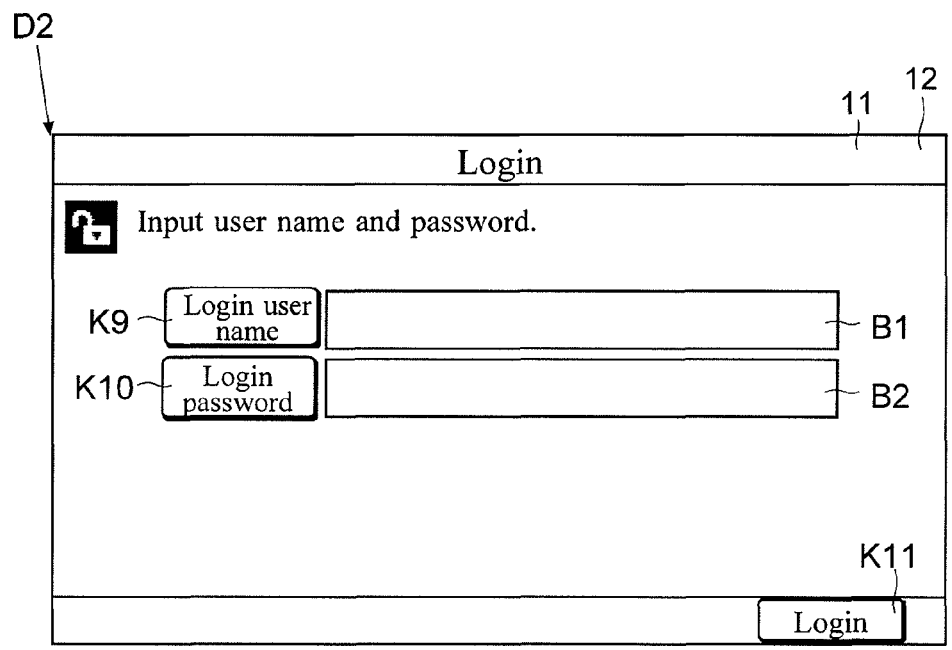
FIG. 13A is an explanatory diagram showing one example of a login screen of an MFP according to a third embodiment of the invention.
Figure 13B:
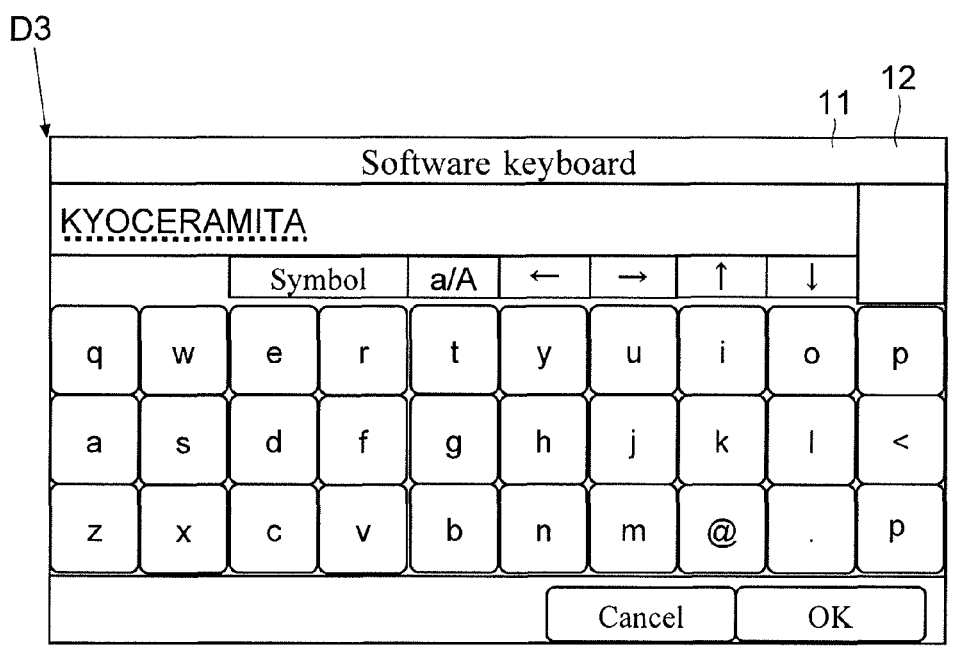
FIG. 13B is an explanatory diagram showing one example of a soft keyboard screen.

Next, based on FIGS. 13 to 15, a third embodiment of the invention will be described. FIG. 13A is an explanatory diagram showing one example of a login screen D2 of an MFP 100 according to the third embodiment of the invention, and FIG. 13B is an explanatory diagram showing one example of a soft keyboard screen D3. FIG. 14 is an explanatory diagram showing one example of a user registration change screen D4 of the MFP 100 according to the third embodiment of the invention. FIG. 15 shows one example of necessary time data according to the third embodiment of the invention.

In the first and second embodiments, upon the recovery from the power-saving mode, the timing of issuing the restart signal RS by the display control part 10 is defined based on, for example, the above (Formula 1). Then the fixed value is used for the necessary time T2 (A in the Formula 1) on one screen in the wizard format. In other words, without depending on the user, the necessary time T2 is defined based on the same necessary time data.

However, a level of familiarity with the settings of the work flow differs from one user to another. Thus, in this embodiment, depending on the user, the necessary time T2 in the (Formula 1) is changed. This embodiment differs from the first and second embodiments in this point that the necessary time T2 in the (Formula 1) varies depending on the user. Other points of this embodiment may be similar to those of the first and second embodiments, and these same points will be omitted from a description and illustration and the description will be given by using the same numerals as those of the first and second embodiments.

First, using FIG. 13, verification of the user will be described. A main body control part 9 in this embodiment basically puts the MFP 100 in an unusable state (logout state). Moreover, an operation panel 1 does not accept settings of the various functions such as copying and the instructions for starting a job. For example, in the unusable state, even when operation or inputting for copying or FAX transmission is performed on the operation panel 1, the operation panel 1 ignores it and the main body control part 9 ignores the inputting of the operation instructions. Moreover, even when image data has been transmitted from the external computer 200, printing is not performed, and the main body control part 9 accepts the image data transmission and temporarily saves it into, for example, the storage device 92 but does not perform printing.

On the other hand, when verification of anyone authorized for use has been made, a login state arises, and the main body control part 9 turns the MFP 100 into a usable state. Moreover, the operation panel 1 accepts the settings for the various functions such as copying and the instructions for starting a job. This description refers to a case where the verification is made through inputting on the operation panel 1.

Now, verification based on the inputting on the operation panel 1 will be described. In order to receive the verification through the inputting on the operation panel 1 for log in, as shown in FIG. 13A, the user is required to input as information for identifying the user (identification information) a user name (may be a user ID) and a login password on the login screen D2. This login screen D2 is displayed at the liquid crystal display part 11 when the MFP 100 is in a logout state.

For example, when the user has pressed a login user name key K9 and a login password key K10 on the login screen D2, the display control part 10 displays the soft keyboard screen D3 as shown in FIG. 13B. On this soft keyboard screen D3, through usage together with a ten key part 13, character strings such as alphabets, Hiragana, numbers, etc. can be inputted.

As described above, the user inputs his/her own login user name and login password. Then the liquid crystal display part 11 displays input results in a user name display box B1 and a password display box B2. Note that, for example, the characters displayed in the password display box B2 are "*" or the like corresponding to character portions of the password, and the password itself is not displayed.

Upon completion of the inputting of the login user name and the login password (inputting of the identification information), the user presses a login key K11. When the display control part 10 has recognized that the login key K11 was pressed, the verification operation is performed. For example, to perform the verification in the operation panel 1, the verification information of the user of the MFP 100 is previously stored into the memory 19 of the operation panel 1. The display control part 10 compares the verification information in the memory 19 and the inputted and acquired identification information including the user name and the password and checks if they agree with each other. If they agree with each other, the display control part 10 transmits to the main body control part 9 data indicating that the display control part 10 may be used and user-related data. Moreover, the display control part 10 releases locking, and the operation panel 1 accepts the settings of the various functions and the instructions for starting a job, if any.

Moreover, for example, the verification may be performed by using the main body control part 9 and the storage device 92. In this case, the verification information on the user of the MFP 100 is previously stored into the storage device 92. Then when the login key K11 has been pressed, the data indicating the login user name and the login password is transmitted from the display control part 10 to the main body control part 9. The main body control part 9 compares the verification information in the storage device 92 and the received identification information to check if they agree with each other. If they agree with each other, the main body control part 9 recognizes that the MFP 100 may be turned into a usable state, and transmits to the display control part 10 data indicating that the MFP 100 may be used and information (for example, user name) specific to the user. Consequently, the display control part 10 releases the locking, and the operation panel 1 accepts the settings for the various functions such as copying and the instructions for starting a job, if any.

This description refers to the example in which the identification information is acquired by inputting to the operation panel 1, but verification through reading may be adopted. For example, each user holds a card storing the identification information. In this case, a read writer is provided in the MFP 100 and reads the card each user holds to acquire the identification information.

Next, referring to FIG. 14, one example of user registration of the MFP 100 will be described. FIG. 14 shows one example of a user registration change screen D4 displayed at the liquid crystal display part 11. This user registration change screen D4 can be opened only by authorized persons such as a manager of the MFP 100, for example, by repeatedly pressing the key displayed at the liquid crystal display part 11 after pressing the system key 17.

Then when the manager or the like has pressed a new key K12, a new user of the MFP 100 can be registered. For example, details (items) of the registration include: "a user name", "a user (in Kana)", "a login user name", "a login password", "an access level", "a department he/she belongs", "a mail address", and "a network address" (for example, IP address). Note that even more items may be registered.

For items not registered, their details are not displayed (for example, the item "user (in Kana)" in FIG. 14). Then for the respective items, change keys K13 to K20 are provided. For example, when any of the change keys K13 to K20 has been pressed, the soft keyboard screen D3 shown in FIG. 13B is displayed, so that numbers, characters, etc. can be inputted. Consequently, registration of a new user of the MFP 100 and change registration for those already registered can be performed. Inputting made on the user registration change screen D4 is stored as verification information into the storage device 92 or the memory 19 when a registration key K21 has been pressed.

Next, FIG. 15 shows one example of necessary time data for each user. In this embodiment, the necessary time T2 is defined in the necessary time data for each user. For example, as shown in FIG. 15, the necessary time data is a table including the data indicating the necessary time T2 for each user.

Then the display control part 10 updates a value in the necessary time data for each user. The display control part 10 counts time from start of making settings in the wizard format to end thereof. For example, upon the recovery from the power-saving mode, if the setting is displaying the setting screen S in the wizard format, the display control part 10 counts time from login to when inputting (for example, by pressing the execution start key K5 on the list screen or pressing the start key 14) for completion of making the settings in the wizard format is made.

Then the display control part 10 divides the counted time by the number f screens included in the wizard format. Consequently, approximate necessary time T2 for each user is obtained. Then the display control part 10 updates the necessary time data stored in the memory 19 and the storage device 92. That is, the input part (touch panel part 12, etc.) accepts the inputting specific to the user, and the control part (display control part 10) recognizes the time required from the start of making the settings in the wizard format to the completion of making the settings, obtains a value by dividing the recognized time by the number of setting screens S in the wizard format, and stores into the storage parts (the memory 19 and the storage device 92) the obtained value as the necessary time data for each user.

Typically, as the user gets familiar with making settings in the wizard format, time spent until the completion of making the settings in the wizard format tends to shorten. Therefore, matching the necessary time data with the user makes it easier to bring the time point at which making the settings in the wizard format is completed closer to the time point at which the fixing part 7 reaches the printable temperature upon the recovery from the power-saving mode.

Now, a flow of control at the time of the recovery from the power-saving mode will be described. In this embodiment, between steps #1 and #2 of FIG. 9 of the first embodiment, inputting and verification on the login screen D2 are performed.

According to the invention of the third embodiment, although a level of familiarity with the settings and a speed of getting familiar therewith vary from one user to another, a time point at which the fixing temperature control at the fixing part 7 is restarted can easily be defined in accordance with each user.

Next, a still another embodiment will be described. Described in the embodiments above is the example in which it is previously defined whether or not to recover from the power-saving mode to the normal mode in the state in which the work flow has been called at the liquid crystal display part 11 (see FIG. 7). However, the invention is applicable even if it is not previously defined whether or not to recover in the state in which the work flow has been called. In this case, for example, upon the recovery from the power-saving mode to the normal mode, it is unknown whether or not the work flow is called, and thus the fixing temperature control at the fixing part 7 is first started. For example, the display control part 10, assuming a case where display is performed in the display format other than the wizard format, issues the restart signal RS towards the main body control part 9 in synchronization with the recovery to the normal mode.

Then before the temperature reaches the printable temperature, when the work flow has been called by pressing, for example, the work flow key 16, the display control part 10 notifies the main body control part 9 that the work flow has been called. In response to this, the main body control part 9 instructs the fixing control part 70 to stop the fixing temperature control (warming up). Then as shown in the embodiments, based on the required stabilization time data, the necessary time data, the current temperature of the fixing part 7 based on the output of the temperature sensor 74, etc., the display control part 10 may issue the restart signal RS for restarting the fixing temperature control.

The first to third embodiments of the invention have been described, although the invention is not limited thereto, and thus various modifications can be made without departing from the spirit of the invention.

What is claimed is:

1. An image forming apparatus comprising:
an operation part including an input part for inputting settings related to the image forming apparatus and a display performing display in a wizard format in which setting screens for a plurality of predefined functions are sequentially displayed in an interactive manner;
a fixing part having therein a heater for fixing a toner onto paper, the fixing part performing fixing temperature control for maintaining a temperature at a printable temperature as a temperature required for fixing a toner image, the fixing part shifting from a normal mode to a power-saving mode under a condition that a predefined time has passed while no inputting has been made on the input part, a condition that instructions for a shift to the power-saving mode have been provided to the input part, or both conditions, and then stopping the fixing temperature control, the fixing part restarting the fixing temperature control after a restart signal for restarting the fixing temperature control is issued;
a temperature detector for detecting a temperature of the fixing part; and
a storage part storing at least: required stabilization time data for defining a required stabilization time required for reaching the printable temperature when the fixing temperature control has been performed starting with a current temperature of the fixing part; and necessary time data for defining a necessary time required for making a setting for one of the setting screens in the wizard format; and
a control part recognizing inputting of settings to the input part, the control part, upon recovery from the power-saving mode to the normal mode since inputting to the input part has been performed and/or an operation detection part has detected that the operation on the image forming apparatus has been performed then restarts the fixing temperature control from a state in which the fixing temperature control is stopped, obtains a current temperature of the fixing part based on output of the temperature detector and the required stabilization time based on the required stabilization time data, the control part, based on the necessary time data and a number of remaining setting screens on which settings need to be performed in the wizard format, issues the restart signal at a time point of switching of the setting screens between a first time point as a time point reached by tracing back by the required stabilization time from a predicted time point at which making the settings is predicted to be complete and a second time point as a time point traced back by the necessary time from the first time point.

2. The image forming apparatus according to claim 1, wherein the control part judges whether or not to issue the restart signal every time the setting screen in the wizard format is switched.

3. The image forming apparatus according to claim 2, wherein the control part issues the restart signal when a value obtained by subtracting from a total number of setting screens a value obtained by adding 1 to a number of setting screens from the first screen to the currently displayed screen becomes smaller than a value obtained by dividing the obtained required stabilization time by the necessary time defined on the necessary time data.

4. The image forming apparatus according to claim 2, wherein the control part sequentially changes a screen number value of the screen currently displayed, and issues the restart signal when a value obtained by multiplying the screen number value and the necessary time defined on the necessary time data becomes equal to the obtained required stabilization time.

5. The image forming apparatus according to claim 1,
wherein the storage part stores as the required stabilization time data a table defining the required stabilization time for each current temperature of the fixing part.

6. The image forming apparatus according to claim 5,
wherein the control part recognizes time required for the fixing part to actually reach the printable temperature when the fixing temperature control has been restarted, and when the obtained required stabilization time is shorter than the time required for actually reaching the printable temperature, makes the storage part update a value of the required stabilization time data in a direction in which the obtained required stabilization time becomes shorter, and when the obtained required stabilization time is longer than the time required for actually reaching the printable temperature, makes the storage part update the value of the required stabilization time data in a direction in which the obtained required stabilization time becomes longer.

7. The image forming apparatus according to claim 1,
wherein the storage part stores a fixed value as the necessary time data.

8. The image forming apparatus according to claim 1,
wherein the input part accepts input specific to a user, and
wherein the control part recognizes time required from a start of making settings in the wizard format to completion of making the settings, obtains a value by dividing the recognized time by a number of setting screens in wizard format, and makes the storage part store the obtained value as the necessary time data for each user.

9. The image forming apparatus according to claim 1,
wherein the input part accepts input for displaying the setting screen in a display format other than the wizard format upon the restart of the fixing temperature control, and
wherein, in a case where the display is to be performed in the display format other than the wizard format upon the restart of the fixing temperature control, the control part issues the restart signal in synchronization with the recovery to the normal mode.

10. The image forming apparatus according to claim 1,
wherein the control part issues the restart signal in synchronization with the recovery to the normal mode, and upon detection of start of making settings in the wizard format before the fixing part reaches the printable temperature, transmits to the fixing part instructions for stopping the fixing temperature control.

11. An image forming apparatus driving method comprising the steps of:
performing display in a wizard format in which setting screens for a plurality of predefined functions are sequentially displayed in an interactive manner;
detecting a temperature of a fixing part having therein a heater for fixing a toner onto paper;
performing fixing temperature control for maintaining a temperature at a printable temperature as a temperature required for fixing a toner image;
under a condition that a predefined time has passed while no inputting has been made on the input part, a condition that instructions for a shift to the power-saving mode has been provided to the input part, or both conditions, shifting from a normal mode to a power-saving mode and stopping the fixing temperature control; and
recognizing inputting of settings to the input part, upon recovery from the power-saving mode to the normal mode since inputting to the input part has been performed and/or the operation on the image forming apparatus has been performed and then restart of the fixing temperature control from a state in which the fixing temperature control is stopped, obtaining a current temperature of the fixing part and required stabilization time based on required stabilization time data for defining the required stabilization time as a time from the current temperature of the fixing part to the printable temperature when the fixing temperature control has been performed, and based on necessary time data for defining a necessary time required for making a setting for one of the setting screens in the wizard format and a number of remaining setting screens on which settings need to be made in the wizard format, issuing a restart signal for starting the fixing temperature control at a time point of switching of the setting screens between a first time point as a time point reached by tracing back by the required stabilization time from a predicted time point at which making the settings is predicted to be complete and a second time point as a time point traced back by the necessary time from the first time point.

12. The image forming apparatus driving method according to claim 11, further comprising the step of judging whether or not to issue the restart signal every time the setting screen in the wizard format is switched.

13. The image forming apparatus driving method according to claim 12, further comprising the step of issuing the restart signal when a value obtained by subtracting from a total number of setting screens a value obtained by adding 1 to a number of setting screens from the first screen to the currently displayed screen becomes smaller than a value obtained by dividing the obtained required stabilization time by the necessary time defined on the necessary time data.

14. The image forming apparatus driving method according to claim 12, further comprising the step of sequentially changing a screen number value of the screen currently displayed, and issuing the restart signal when a value obtained by multiplying the screen number value and the necessary time defined on the necessary time data becomes equal to the obtained required stabilization time.

15. The image forming apparatus driving method according to claim 11, further comprising the step of storing as the required stabilization time data a table defining the required stabilization time for each current temperature of the fixing part.

16. The image forming apparatus driving method according to claim 15, further comprising the step of recognizing time required for actually reaching the printable temperature when the fixing temperature control has been restarted, and when the obtained required stabilization time is shorter than the time required for actually reaching the printable temperature, updating a value of the required stabilization time data in a direction in which the obtained required stabilization time becomes shorter, and when the obtained required stabilization time is longer than the time required for actually reaching the printable temperature, updating the value of the required stabilization time data in a direction in which the obtained required stabilization time becomes longer.

17. The image forming apparatus driving method according to claim 11, further comprising the step of storing a fixed value as the necessary time data.

18. The image forming apparatus driving method according to claim 11, further comprising the steps of:
accepting input specific to a user; and
recognizing time required from a start of making settings in the wizard format to completion of making the settings, obtaining a value by dividing the recognized time by a number of setting screens in the wizard format, and storing the obtained value as the necessary time data for each user.

19. The image forming apparatus driving method according to claim 11, further comprising the steps of:
accepting input for displaying the setting screen in a display format other than the wizard format upon the restart of the fixing temperature control, and
in a case where the display is to be performed in the display format other than the wizard format upon the restart of the fixing temperature control, issuing the restart signal in synchronization with the recovery to the normal mode.

20. The image forming apparatus driving method according to claim 11, further comprising the steps of:
issuing the restart signal in synchronization with the recovery to the normal mode; and
upon detection of a start of making settings in the wizard format before the fixing part reaches the printable temperature, stopping the fixing temperature control.

* * * * *